US012615518B2

(12) United States Patent　　(10) Patent No.:　US 12,615,518 B2
Iwatani et al.　　(45) Date of Patent:　Apr. 28, 2026

(54) INTERFERENCE CONTROL SYSTEM, INTERFERENCE CONTROL METHOD, LINK-UP DEVICE AND PROGRAM FOR INTERFERENCE CONTROL FOR WIRELESS COMMUNICATIONS

(71) Applicant: NTT, Inc., Tokyo (JP)

(72) Inventors: Junichi Iwatani, Musashino (JP);
Yasuhiko Inoue, Musashino (JP);
Yusuke Asai, Musashino (JP)

(73) Assignee: NTT, Inc., Tokyo (JP)

( * ) Notice: Subject to any disclaimer, the term of this patent is extended or adjusted under 35 U.S.C. 154(b) by 301 days.

(21) Appl. No.: 18/278,005

(22) PCT Filed: Mar. 3, 2021

(86) PCT No.: PCT/JP2021/008278
§ 371 (c)(1),
(2) Date: Aug. 21, 2023

(87) PCT Pub. No.: WO2022/185461
PCT Pub. Date: Sep. 9, 2022

(65) Prior Publication Data
US 2024/0129747 A1　　Apr. 18, 2024

(51) Int. Cl.
*H04W 16/14*　　(2009.01)
*H04W 60/00*　　(2009.01)

(52) U.S. Cl.
CPC ........... *H04W 16/14* (2013.01); *H04W 60/00* (2013.01)

(58) Field of Classification Search
CPC ............................. H04W 16/14; H04W 60/00
See application file for complete search history.

(56) References Cited

U.S. PATENT DOCUMENTS

2010/0151789 A1*　6/2010　Suzuki ................ G01S 5/02521
455/41.2
2012/0142342 A1　　6/2012　Murakami
(Continued)

FOREIGN PATENT DOCUMENTS

JP　　　2006-166405 A　　6/2006
JP　　　2010219753 A　*　9/2010
(Continued)

OTHER PUBLICATIONS

English version JP 2010219753 (Year: 2010).*
(Continued)

*Primary Examiner* — Matthew D. Anderson
*Assistant Examiner* — Michele C Douglas
(74) *Attorney, Agent, or Firm* — XSENSUS LLP

(57)　　　　　　ABSTRACT

Provided is an interference control system for wireless communication suitable for limiting the total amount of interference given to an interfered device to be protected by a large number of interfering devices. An interference control system includes a subscriber database that stores information regarding a position of each interfering device. A registration application (5) including an ID of an interfering device disposed in a carrier network is received from the interfering device. The registration application is received and position information that matches information stored in the subscriber database regarding the ID is set (2), (3), and (6). The position information is transmitted to the control device for registration (6).

13 Claims, 19 Drawing Sheets

(56) References Cited

U.S. PATENT DOCUMENTS

| 2016/0277165 | A1* | 9/2016 | Wei | H04L 5/0048 |
| 2017/0265241 | A1* | 9/2017 | Fujishiro | H04W 16/14 |
| 2017/0359733 | A1* | 12/2017 | Yamazaki | H04B 17/345 |
| 2024/0129747 | A1* | 4/2024 | Iwatani | H04W 60/00 |

FOREIGN PATENT DOCUMENTS

| WO | WO-2011021431 | A1* | 2/2011 | H04W 64/003 |
| WO | 2020/189022 | A1 | 9/2020 | |

OTHER PUBLICATIONS

English version WO 2011021431 (Year: 2011).*
"Signaling Protocols and Procedures for Citizens Broadband Radio Service (CBRS): Spectrum Access System (SAS)—Citizens Broadband Radio Service Device (CBSD) Interface Technical Specification", Wireless Innovation Forum, Document WINNF-TS-0016, Version V1.2.6, Available Online at: https://cbrs.wirelessinnovation.org/release-1-of-the-baseline-standardspecifications, Nov. 25, 2020, 60 pages.

* cited by examiner

INTERFERENCE CONTROL SYSTEM, INTERFERENCE CONTROL METHOD, LINK-UP DEVICE AND PROGRAM FOR INTERFERENCE CONTROL FOR WIRELESS COMMUNICATIONS

CROSS-REFERENCE TO RELATED APPLICATION

The present application is based on PCT filing PCT/JP2021/008278, filed Mar. 3, 2021, the entire contents of which are incorporated herein by reference.

TECHNICAL FIELD

This disclosure relates to an interference control system, an interference control method, a link-up device, and program for interference control for wireless communication, and more particularly, to an interference control system, an interference control method, a link-up device, and program for interference control for wireless communication suitable for limiting the total amount of interference given to another interfered device to be protected by a large number of interfering devices having a wireless communication function.

BACKGROUND ART

As a technology on the premise of a mixture of an interfered device to be protected and a plurality of interfering devices that emits interference signals, there is known a citizens broadband radio service (CBRS) proposed in the United States. More specifically, the CBRS is a technology of wireless communication having a function of suppressing the total amount of interference with respect to the interfered device when the interfered device and the interfering device use the same frequency band. Non Patent Literature 1 below describes a technical standard related to CBRS.

In the CBRS, each of an interfered device and a plurality of interfering devices (CBSD: citizens broadband radio service device) preregisters their position information in a control device (SAS: spectrum access system) via a network. The position information described above includes information indicating the latitude and the longitude of each of the interfering devices and whether the devices are installed indoors or outdoors.

Each of the interfering devices transmits a usage application of radio resources such as a use frequency and transmission power to the control device. The control device that has received the usage application estimates the total amount of interference given to the interfered device by all the interfering devices. The total amount of interference is calculated from position information registered in advance for each of the interfered device and the interfering device, an antenna gain, transmission power, and the like of each device. Then, the control device determines whether or not the usage application is acceptable depending on whether or not the estimated value of the total amount of interference falls within the allowable value, and returns a result of the determination to the interfering device as a response.

Note that, in the CBRS, the application and the response between the interfering device and the control device may be directly exchanged, or may be exchanged via a link-up device (domain proxy).

CITATION LIST

Non Patent Literature

CBRS Baseline Standards, WINNF-TS-0016, CBRS WInnForum Standards, Nov. 25, 2020. https://cbr-s.wirelessinnovation.org/release-1-of-the-baseline-standard-specifications

SUMMARY OF INVENTION

Technical Problem

In an optical access service provided by a communication carrier, a large number of subscribers use a wireless device such as an access point of a wireless LAN. Similarly to the interfering device in the CBRS, the wireless devices may be an interference source with respect to the interfered device to be protected.

In a case where the CBRS technology is applied to the above optical access service, a configuration in which a large number of interfering devices is disposed in a network of a service provider and a control device is disposed outside the network is used. Then, it is assumed that the position registration of the interfering device with respect to the control device is left to the subscriber.

As a method for the service subscriber to acquire the position information of the interfering device, for example, it is conceivable to use a GPS function built in the interfering device. However, in a case where the wireless device is installed indoors, it is difficult to acquire an accurate position by the GPS. In addition, in a case where the application for the position information is left to the subscriber, it is also assumed that the position information is intentionally falsified information.

Therefore, in a case where the wireless device managed by the service subscriber is the interfering device, the CBRS technology can cause a situation in which the control device cannot accurately grasp the position of the interfering device. Then, under such a situation, it is difficult to accurately calculate the total interference amount with respect to the interfered device, and thus, it is difficult to appropriately protect the communication of the interfered device.

The present disclosure has been made in view of the above problems, and it is a first object to provide an interference control system for wireless communication capable of converting position information into information necessary for calculating a correct interference amount and delivering the information to a control device in a case where registration of the position information is applied for from a plurality of interfering devices belonging to a specific network toward a control device placed outside the network.

In addition, the present disclosure has a second object to provide an interference control method for wireless communication capable of converting position information into information necessary for calculating a correct interference amount and delivering the information to a control device in a case where registration of the position information is applied for from a plurality of interfering devices belonging to a specific network toward a control device placed outside the network.

In addition, the present disclosure has a third object to provide a link-up device for wireless communication capable of converting position information into information necessary for calculating a correct interference amount and delivering the information to a control device in a case where registration of the position information is applied for from a plurality of interfering devices belonging to a specific network toward a control device placed outside the network.

In addition, the present disclosure has a fourth object to provide an interference control program for wireless communication capable of converting position information into information necessary for calculating a correct interference amount and delivering the information to a control device in a case where registration of the position information is applied for from a plurality of interfering devices belonging to a specific network toward a control device placed outside the network.

Solution to Problem

In order to achieve the above object, a first aspect is desirably an interference control system for wireless communication that causes a control device responsible for calculating an interference amount to register position information of each of a plurality of interfering devices that performs wireless communication in order to calculate the interference amount given to an interfered device that performs wireless communication by the plurality of interfering devices, the interference control system including:

a processor unit;

a memory that stores a program to be executed by the processor unit; and a subscriber database that stores information regarding a position of each of the interfering devices, in which the processor unit executes:

processing of receiving a registration application including an ID of an interfering device disposed in a carrier network from the interfering device;

position information generation processing of setting position information that matches information stored in the subscriber database regarding the ID upon receiving the registration application; and processing of transmitting the position information to the control device for registration.

In addition, a second aspect is desirably an interference control method for wireless communication that causes a control device responsible for calculating an interference amount to register position information of each of a plurality of interfering devices that performs wireless communication in order to calculate the interference amount given to an interfered device that performs wireless communication by the plurality of interfering devices, the interference control method including:

a step of receiving a registration application including an ID of an interfering device disposed in a carrier network from the interfering device;

a step of setting position information that matches information stored in a subscriber database that stores information regarding a position of each of the interfering devices upon receiving the registration application; and a step of transmitting the position information to the control device for registration.

In addition, a third aspect is desirable a link-up device for wireless communication that causes a control device responsible for calculating an interference amount to register position information of each of a plurality of interfering devices that performs wireless communication in order to calculate the interference amount given to an interfered device that performs wireless communication by the plurality of interfering devices, the link-up device including:

a processor unit;

a memory that stores a program to be executed by the processor unit; and a subscriber database that stores information regarding a position of each of the interfering devices, in which the processor unit executes:

processing of receiving a registration application including an ID of an interfering device disposed in a carrier network from the interfering device;

position information generation processing of setting position information that matches information stored in the subscriber database regarding the ID upon receiving the registration application; and processing of transmitting the position information to the control device for registration.

In addition, a fourth aspect is desirably an interference control program for wireless communication for implementing the link-up device according to the third aspect, the interference control program including a program for causing a processor unit to execute:

processing of receiving a registration application including an ID of an interfering device disposed in a carrier network from the interfering device;

a step of setting position information that matches information stored in a subscriber database that stores information regarding a position of each of the interfering devices upon receiving the registration application; and processing of transmitting the position information to the control device for registration.

Advantageous Effects of Invention

According to the first to fourth aspects, it is possible to convert position information into information necessary for calculating a correct interference amount and deliver the information to a control device in a case where registration of the position information is applied for from a plurality of interfering devices belonging to a specific network toward a control device placed outside the network.

DESCRIPTION OF EMBODIMENTS

First Embodiment

Comparative Example of First Embodiment

Figure 1:
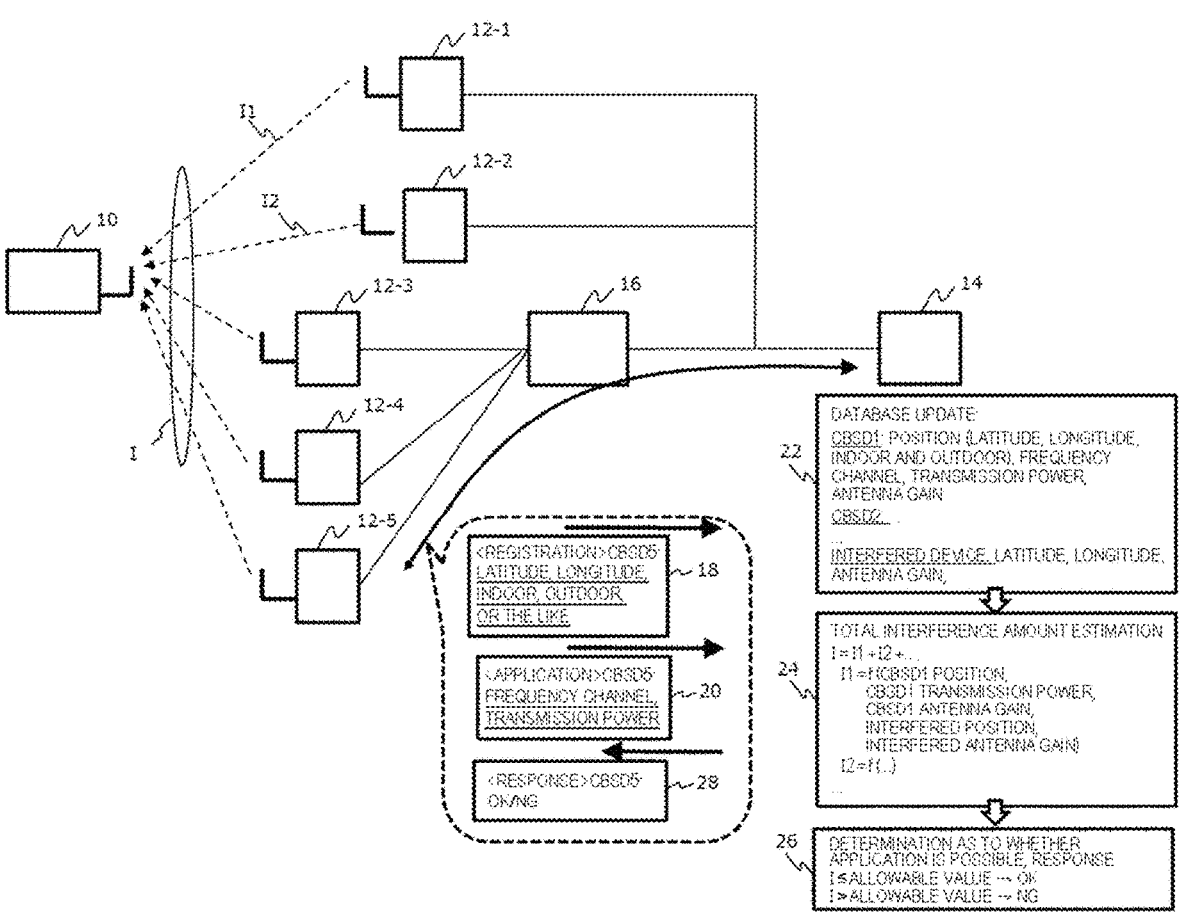
FIG. 1 is a diagram for describing an outline of an interference control system using CBRS which is a comparative example of a system of a first embodiment of the present disclosure.

FIG. 1 is a diagram for describing an outline of an interference control system using CBRS. Hereinafter, as a comparative example of the interference control system of the first embodiment of the present disclosure, the configuration and operation of this system will be described.

The system illustrated in FIG. 1 includes an interfered device 10. The interfered device 10 is a wireless device that needs to be protected for communication quality. The system illustrated in FIG. 1 includes a plurality of interfering devices 12-1 to 12-5. Here, five interfering devices are illustrated. In a case where it is not necessary to distinguish the interfering devices 12-1 to 12-5 from each other, they will be hereinafter referred to as interfering devices 12 using reference numeral 12. The interfering device 12 is a wireless device that shares the same frequency band with the interfered device 10.

A radio signal emitted from the interfering device 12 may interfere with a radio signal received by the interfered device 10. In FIG. 1, for example, the interference amount caused by the interfering device 12-1 is represented as "I1", and the interference amount caused by the interfering device 12-2 is represented as "I2". In addition, the total amount of interference, which is the sum of interference caused by each interfering device 12, is represented as "I". In order to protect communication of the interfered device 10, it is necessary to suppress the total interference amount I to an allowable value or less.

In the system illustrated in FIG. 1, some interfering devices 12-1 and 12-2 are directly connected to a control device 14 of the CBRS. In addition, the other interfering devices 12-3 to 12-5 are connected to the control device 14 via a link-up device 16. The link-up device 16 can relay the resource application and the response between each of the plurality of interfering devices 12-3 to 12-5 and the control device 14.

In the system using the CBRS, each of the interfered device 10 and the interfering device 12 preregisters the ID, the position information, and the like of the device in the control device 14 prior to the start of communication. FIG. 1 illustrates a registration message 18 transmitted from the interfering device 12-5 to the control device 14. The registration message 18 specifically includes the information described below.

1. Device ID=CBSD5
2. Latitude and longitude of installation position of the device
3. Information indicating whether the device is installed indoors or outdoors
4. Antenna gain of the device After the pre-registration described above, each of the interfering devices 12 applies for a communication resource to be used toward the control device 14 when starting communication. FIG. 1 illustrates a state in which a resource application 20 including ID=CBSD5 is issued from the interfering device 12-5 to the control device 14. The resource application 20 specifically includes the information described below.

1. Frequency channel desired to be used for communication
2. Transmission power desired to be used for signal transmission A database update unit 22 is formed inside the control device 14. The database update unit 22 updates information regarding frequency usage status and the like on the basis of the information obtained by the pre-registration, the information obtained by the resource application, and the information of the response generated for the resource application, and the like. Specifically, when receiving a resource application from a specific interfering device 12, the database update unit 22 updates the database assuming a case where the application is permitted. In addition, when it is determined whether the application is acceptable and a response indicating the result is generated, the database is updated again so that the content of the response is reflected.

A total interference amount estimation unit 24 is formed inside the control device 14. The total interference amount estimation unit 24 calculates the interference amount caused by each interfering device 12, and sets the sum thereof as the total interference amount I. For example, the interference amount I1 caused by the interfering device 12-1 can be calculated by a known method as a function of the position of CBSD1, the transmission power of CBSD1, and the antenna gain of CBSD1, and the position of the interfered device 10, and the antenna gain of the interfered device 10. Then, when a resource application is received from the interfering device 12-1, the interference amount I1 caused when the application is permitted can be estimated by using the transmission power included in the application for the above calculation. When the resource application is not received from the interfering device 12-1, the interference amount I1 is calculated on the basis of the radio resource practically used by the interfering device 12-1. The same applies to the interference amounts I2 to I5 of the other interfering devices 12. The total interference amount I is calculated by taking the sum of the interference amounts I1 to I5 estimated or calculated in this manner.

An acceptability determination/response unit 26 is further formed inside the control device 14. The acceptability determination/response unit 26 determines whether the total interference amount I estimated in response to the resource application issued by any of the interfering devices 12 is equal to or less than an allowable value of interference with respect to the interfered device 10. In a case where the relationship of "total interference amount I≤allowable value" is established, it can be determined that excessive interference does not occur in the interfered device 10 even when the resource application is permitted. In this case, the acceptability determination/response unit 26 generates an OK response to the resource application. On the other hand, in a case where the relationship of "total interference amount>allowable value" is established, it can be determined that unacceptable interference occurs in the interfered device 10 when the resource application is permitted. In this case, the acceptability determination/response unit 26 generates an NG response to the resource application.

The response generated by the acceptability determination/response unit 26 is transmitted to the interfering device 12 directly or via the link-up device 16. FIG. 1 illustrates a state in which a response 28 is transmitted from the control device 14 to the interfering device 12-5 via the link-up device 16. Here, as illustrated, information of OK or NG is included together with ID=CBSD5.

When receiving an OK response to the resource application, the interfering device 12 starts communication using the frequency and transmission power for which the application is made. On the other hand, when receiving an NG response to the resource application, the resource application is performed again by changing the requested resource. According to the above processing, it is possible to continue to appropriately protect the communication of the interfered device 10 while permitting efficient communication to a large number of the interfering devices 12.

Configuration of First Embodiment

Figure 2:
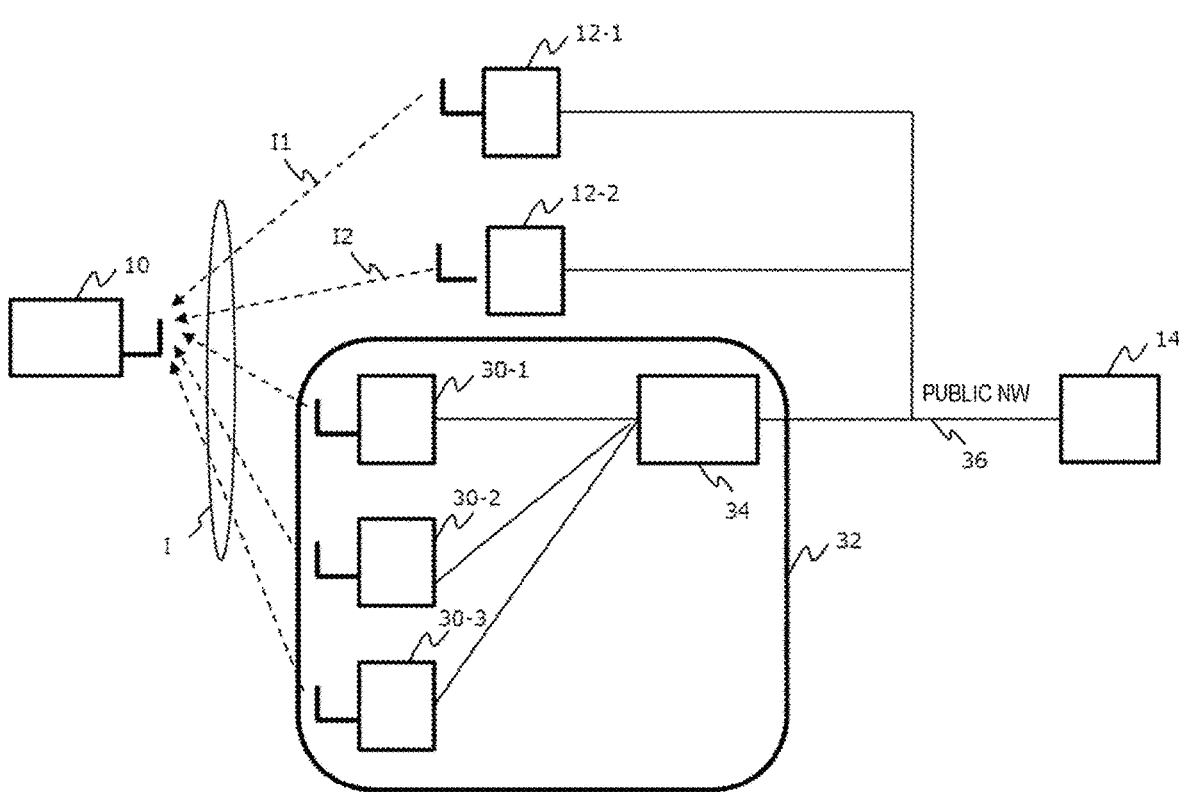
FIG. 2 is a diagram for describing an outline of the interference control system of the first embodiment of the present disclosure.

FIG. 2 illustrates a configuration of the interference control system of the first embodiment of the present disclosure. In the interference control system illustrated in FIG. 2, an optical access service provided by a specific communication carrier is incorporated in the configuration of the CBRS illustrated in FIG. 1. Note that, in FIG. 2, the same elements as those illustrated in FIG. 1 are denoted by the same reference numerals, and the description thereof will be omitted or simplified.

The system illustrated in FIG. 2 includes a plurality of interfering devices 30-1 to 30-3 together with interfering devices 12-1 and 12-2. The interfering devices 12-1 and 12-2 are disposed in a public network (NW) 36 together with the control device 14. Hereinafter, in a case where it is not necessary to distinguish the interfering devices 12-1 and 12-2 from each other, they are referred to as "interfering devices 12".

The interfering devices 30-1 to 30-3 are wireless devices managed by subscribers of optical access services provided by communication carriers. Hereinafter, when it is not necessary to distinguish the interfering devices 30-1 to 30-3 from each other, they are referred to as "interfering devices 30" using reference numeral 30. The interfering device 30 is disposed in a network (hereinafter, referred to as a "carrier NW 32") managed by a communication carrier. Note that the interfering device 30 is connected to the carrier NW 32 via a subscriber network managed by the subscriber, but here, they are not distinguished and are referred to as a "carrier NW 32".

In addition, a link-up device 34 is disposed in the carrier NW 32. The link-up device 34 is an element constituting a main part of the interference control system of the present embodiment, and has a function of relaying a resource application and a response between the interfering device 30 and the control device 14.

Figure 3:
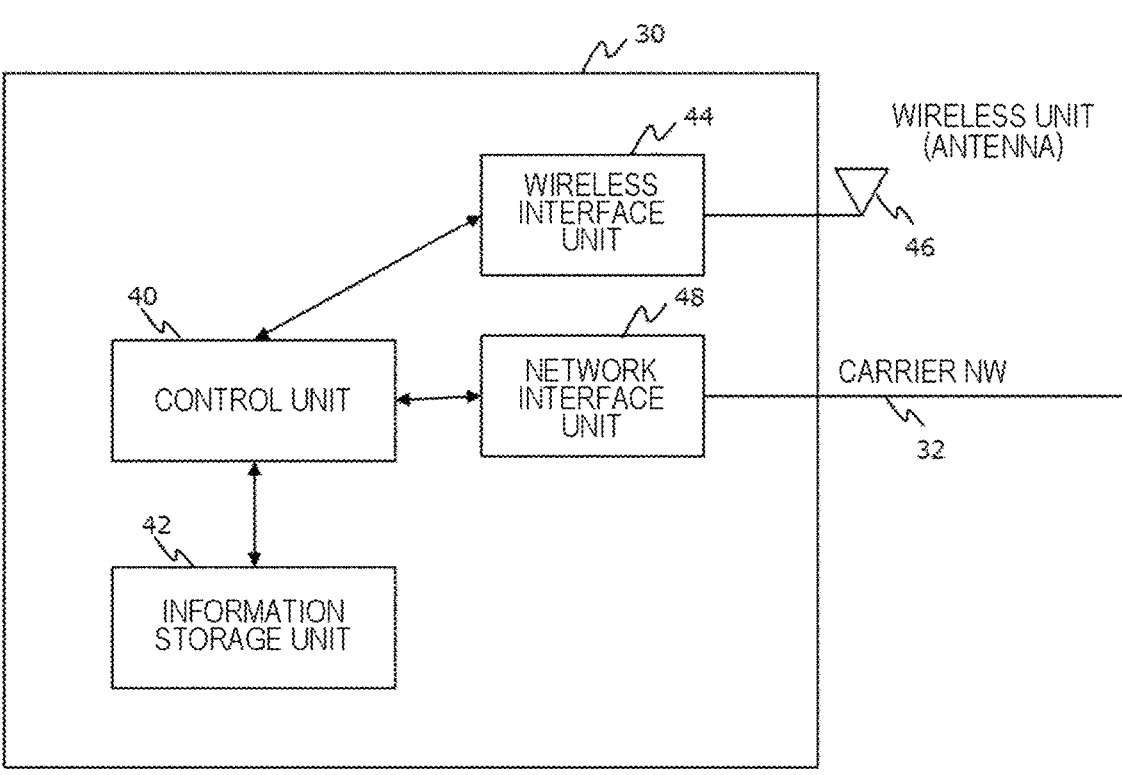
FIG. 3 is a diagram for describing a configuration of an interfering device disposed in a carrier NW in FIG. 2.

FIG. 3 is a block diagram for describing a configuration of the interfering device 30 illustrated in FIG. 2. As illustrated in FIG. 3, the interfering device 30 includes a control unit 40 and an information storage unit 42. The control unit 40 includes a processor unit (CPU). In addition, the information storage unit 42 includes a memory, and the memory stores a program to be executed by the CPU. The function of the control unit 40 is implemented by the CPU of the control unit 40 proceeding with the processing in accordance with the above-described program. The information storage unit 42 further stores resource information regarding an ID of the device, position information, a frequency used for communication, and the like.

The interfering device 30 includes a wireless interface unit 44. The wireless interface unit 44 can establish wireless communication with an external wireless device via an antenna 46. In addition, the wireless interface unit 44 can acquire GPS information of the device via the antenna 46. The interfering device 30 further includes a network interface unit 48. The network interface unit 48 can transmit and receive messages to and from the link-up device 34 via the carrier NW 32.

Figure 4:
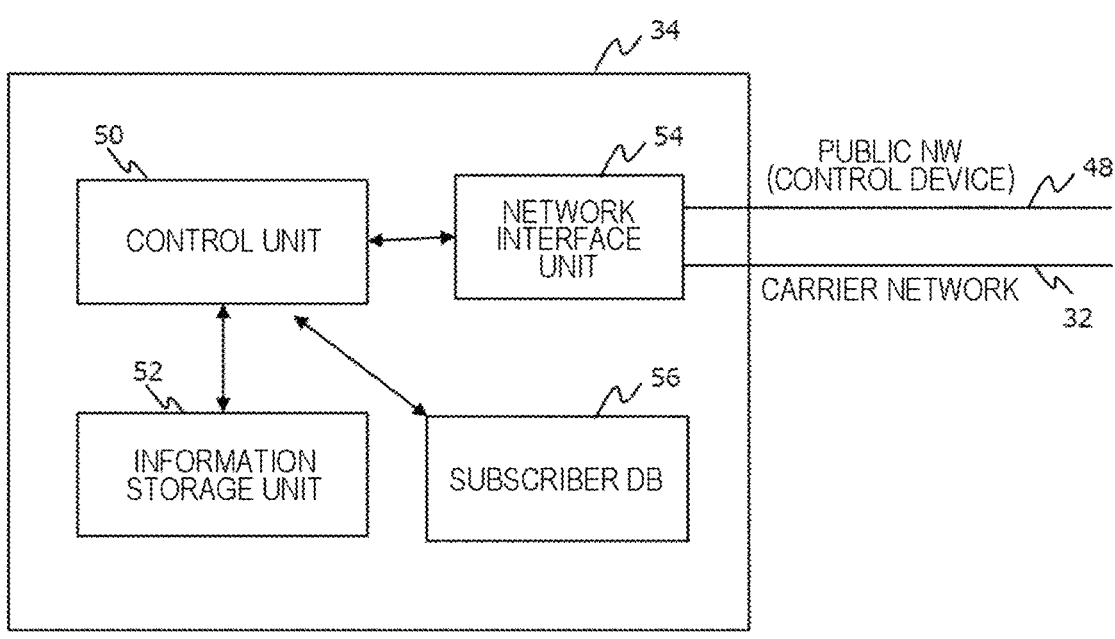
FIG. 4 is a diagram for describing a configuration of a link-up device illustrated in FIG. 2.

FIG. 4 is a block diagram for describing a configuration of the link-up device 34 illustrated in FIG. 2. As illustrated in FIG. 4, the link-up device 34 includes a control unit 50 and an information storage unit 52. The control unit 50 includes a processor unit (CPU). In addition, the information storage unit 52 includes a memory, and the memory stores a program to be executed by the CPU. The function of the control unit 50 is implemented by the CPU of the control unit 50 proceeding with the processing in accordance with the above-described program. This program can be recorded in a recording medium and provided to the link-up device 34, and can also be provided to the link-up device 34 via a network. The information storage unit 52 further stores information such as content of a message to be relayed and a frequency usage table. As will be described below, the frequency usage table records information of radio resources used by each of the interfering devices 30 and the like.

The link-up device 34 includes a network interface unit 54. The network interface unit 54 can transmit and receive messages to and from each of the interfering devices 30 via the carrier NW 32, and can transmit and receive messages to and from the control device 14 via the public NW 36.

The link-up device 34 further includes a subscriber database (DB) 56. The subscriber DB 56 stores information regarding the position of the interfering device 30 such as an ID and an address of a subscriber who manages the interfering device 30.

Figure 5:
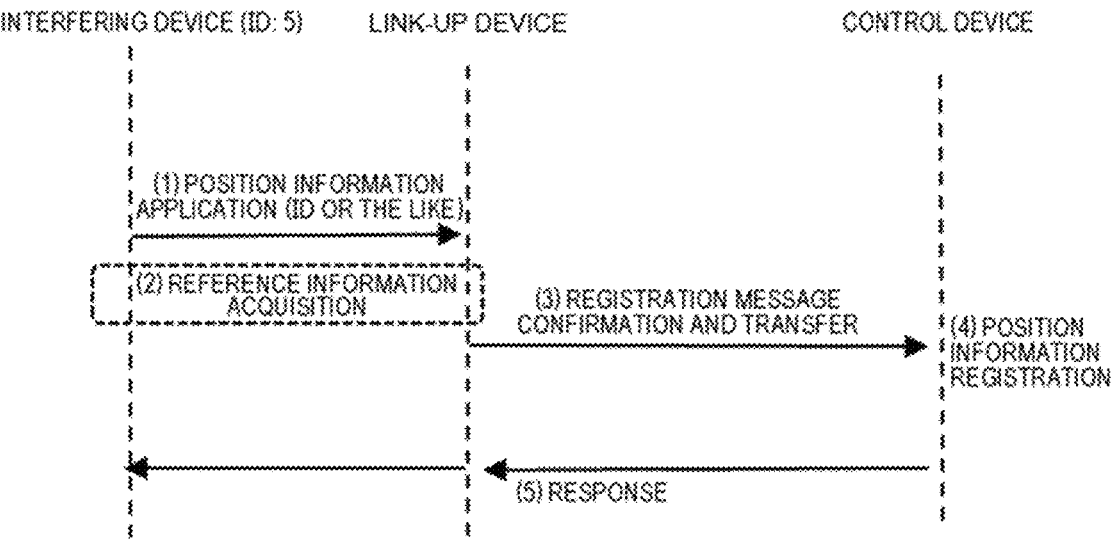
FIG. 5 is a diagram for describing an outline of an operation of the interference control system according to the present disclosure.

FIG. 5 is a diagram for describing an outline of an operation of the interference control system illustrated in FIG. 2. In the interference control system according to the present disclosure, as in the case of the CBRS illustrated in FIG. 1, the position information of the interfered device 10 and the interfering devices 12 and 30 is pre-registered in the control device 14. The position information includes latitude and longitude, and information indicating whether the installation is indoor or outdoor. FIG. 5 illustrates an operation when an interfering device 30-5 belonging to the carrier NW 32 pre-registers the position information.

FIG. 5 specifically illustrates that the operation described below is executed in time series.

(1) The interfering device 30-5 issues an application for registration of position information. This application includes the ID and the like of the interfering device 30-5.

(2) The link-up device 34 that has received the application for registering the position information refers to the subscriber DB by using the ID included in the application, and acquires information regarding the position of the interfering device 30, such as the address of the subscriber who manages the interfering device 30-5.

(3) The link-up device 34 sets position information that matches the information acquired in the above processing. Then, the registration message including the position information that has been confirmed to match is transferred toward the control device 14.

(4) The control device 14 registers the information as the position information of the interfering device 30-5.

(5) The control device 14 returns a message informing the registration completion as a response.

As described above, in the interference control system of the present disclosure, the authority to finally determine the position information of the interfering device 30 is given to the link-up device 34. Therefore, with this system, it is possible to prevent inappropriate position information from being registered in the control device 14 due to a subscriber's intention or an error, and it is possible to give high accuracy to the calculation of the total interference amount I experienced by the interfered device 10.

Features of First Embodiment

Figure 6:
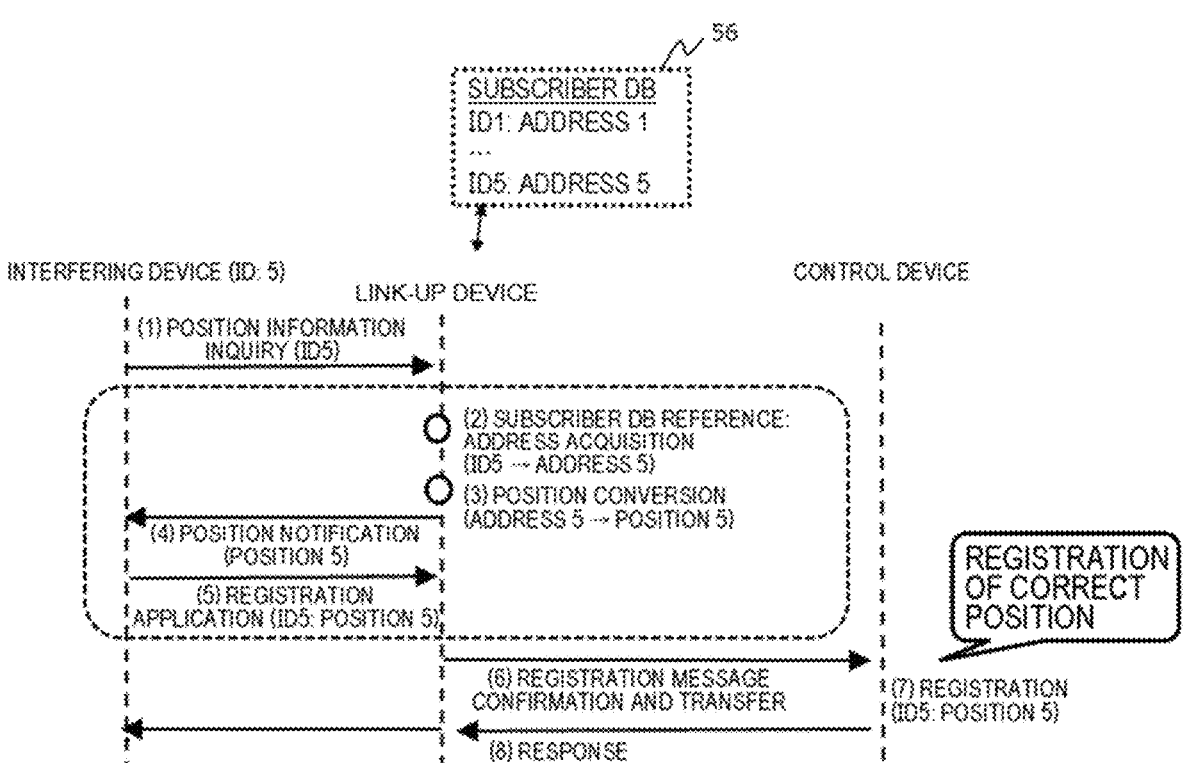
FIG. 6 is a diagram for describing an operation of the interference control system of the first embodiment of the present disclosure.

FIG. 6 is a diagram for specifically describing a flow of processing executed in the present embodiment to implement the functions described above. FIG. 6 illustrates that the processing described below is executed in time series in the interference control system of the present embodiment. Note that, similarly to FIG. 5, FIG. 6 illustrates an operation when the interfering device 30-5 pre-registers the position information.

(1) The interfering device 30-5 that requests registration of position information transmits a position information inquiry toward the link-up device 34. The application for the position information inquiry includes the ID (for example, "ID 5") of the interfering device 30-5.

(2) The link-up device 34 that has received the position information inquiry refers to the subscriber DB 56. The subscriber DB 56 stores information regarding the position of the interfering device 30 such as an address of a subscriber for each ID of the interfering device 30.

The link-up device 34 acquires an address (for example, "address 5") corresponding to the ID (for example, "ID 5") from the subscriber DB 56 as the address of the interfering device 30.

(3) Next, the link-up device 34 performs position conversion on the address (for example, "address 5"), and acquires converted position information (for example, "position 5") indicating the position of the address. The converted position information is information defining the absolute position of the address, and can be, for example, "latitude and longitude" of the address 5.

(4) The link-up device 34 notifies the interfering device 30, which has issued the position information inquiry, of the converted position information (for example, the "position 5") acquired by the above conversion. (5) The interfering device 30 having received the above notification next issues a registration application. The registration application includes information regarding the position of the interfering device 30 in addition to the ID (for example, "ID 5"). In the present embodiment, the converted position information (for example, "position 5") a notification of which is given from the link-up device 34 is used as the information regarding the position.

(6) The link-up device 34 that has received the registration application checks whether or not the information regarding the position included in the application (for example, "position 5") matches the converted position information (for example, "position 5") acquired in the above (3). Then, when matching therebetween is recognized, the registration message is transferred to the control device 14 using the information as the position information.

(7) The control device 14 that has received the above transfer from the link-up device 34 registers the position information (for example, "position 5") included in the registration application as the position information corresponding to the ID (for example, "ID 5"). The position information registered in this manner is correct information set by the link-up device 34 on the basis of the information of the subscriber DB 56. Therefore, according to the above processing, accurate position information can be registered in the control device 14.

(8) When the above registration is finished, the control device 14 issues a response indicating registration completion toward the interfering device 30 that has requested the registration application via the link-up device 34.

Figure 7:
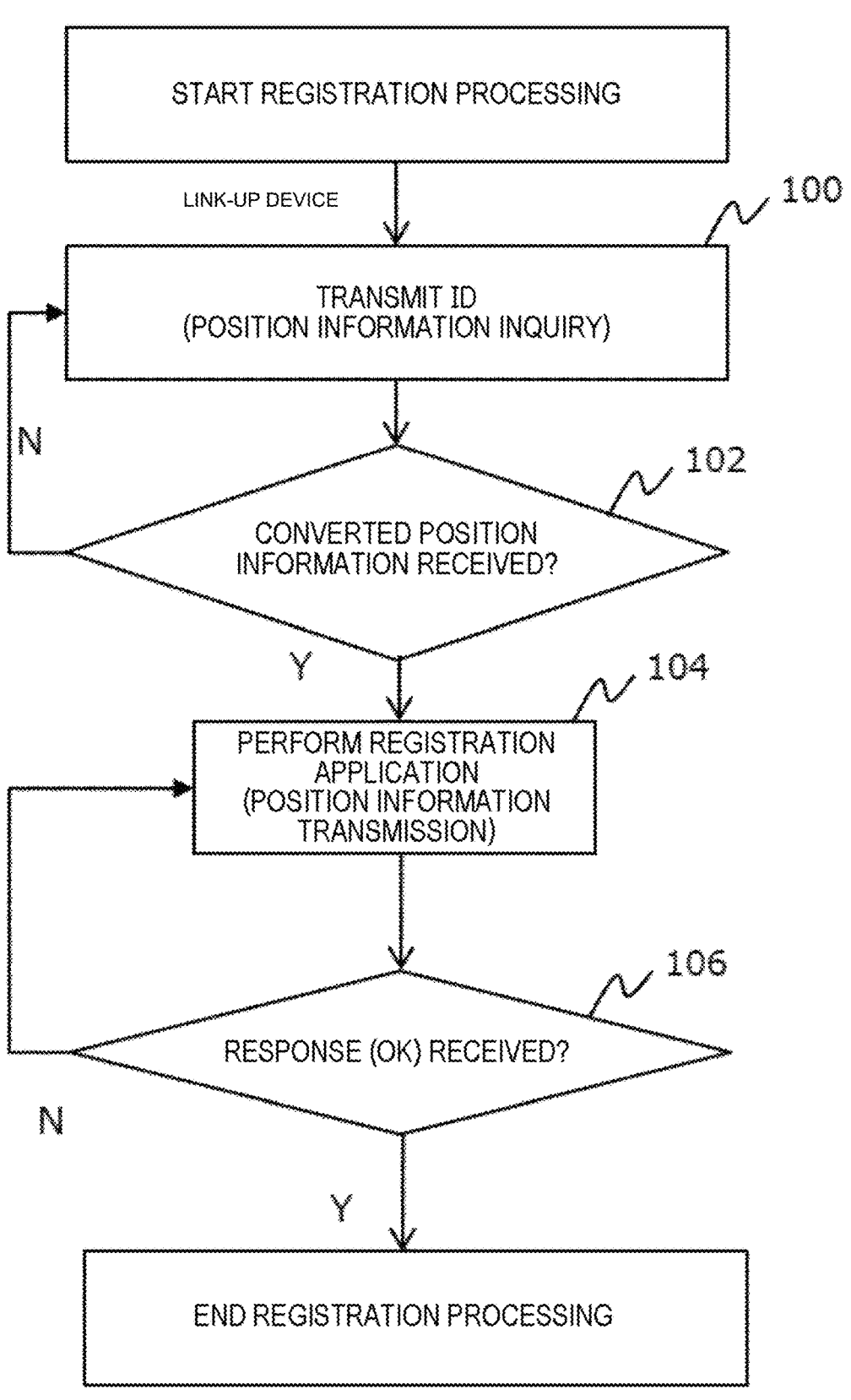
FIG. 7 is a flowchart for describing a flow of processing executed by an interfering device disposed in a carrier NW at the time of applying for registration of position information in the first embodiment of the present disclosure.

FIG. 7 is a flowchart for describing a flow executed by each of the interfering devices 30 included in the carrier NW in order to implement the above operation.

As illustrated in FIG. 7, the interfering device 30 that requests registration of position information first requests position information inquiry to transmit its own ID (for example, "ID 5") (step 100).

Thereafter, it is determined whether converted position information (for example, "position 5") in response to the above inquiry has been received from the link-up device 34 (step 102).

When the reception of the converted position information is recognized, the registration application including the converted position information is transmitted together with the ID (step 104).

Thereafter, when a response indicating that the registration application is permitted is received (step 106), the registration processing in the interfering device 30 ends.

Figure 8:
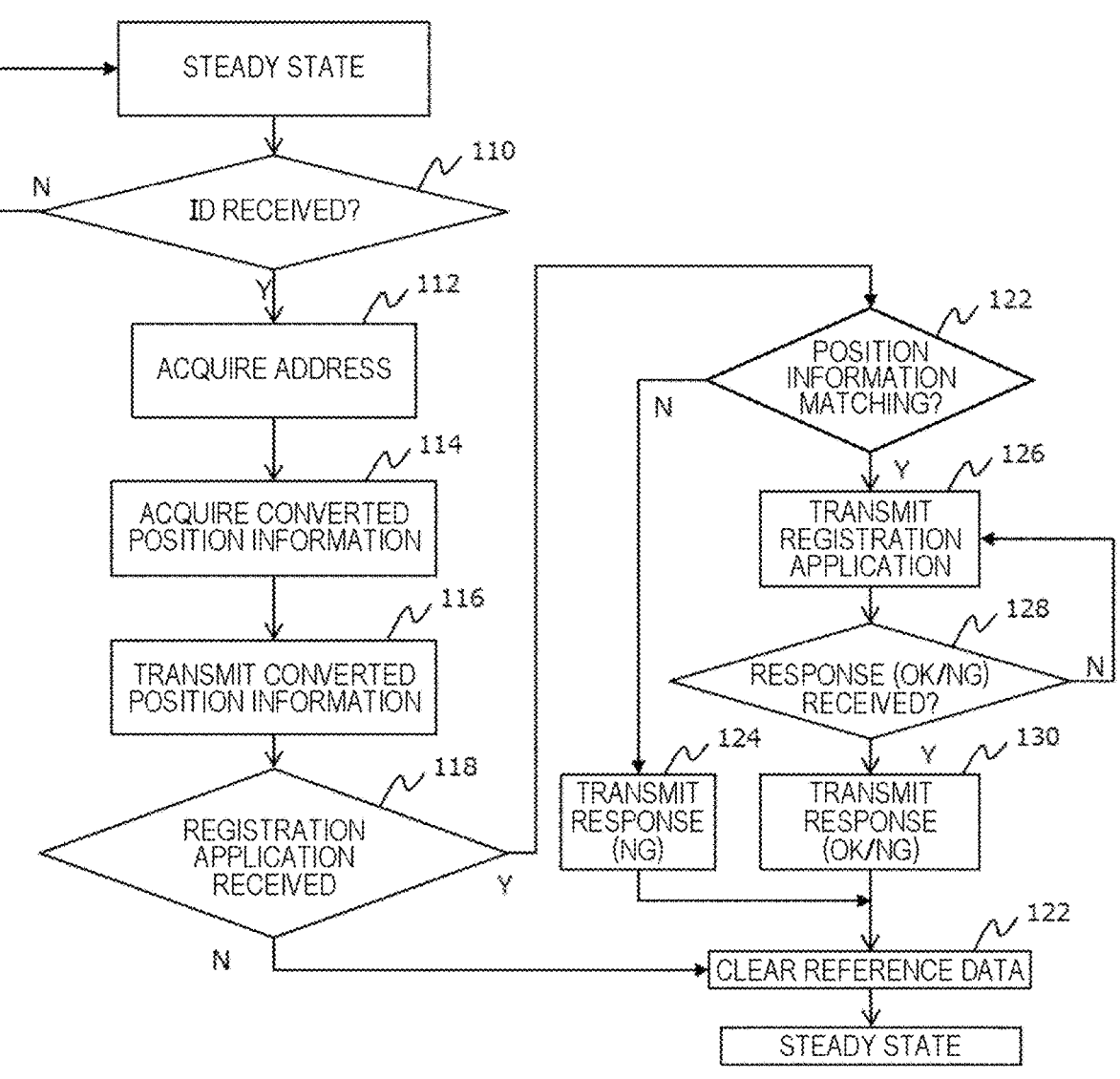
FIG. 8 is a flowchart for describing a flow of processing executed by a link-up device at the time of applying for registration of position information in the first embodiment of the present disclosure.

FIG. 8 is a flowchart for describing a flow of processing executed by the link-up device 34 regarding registration of position information in the present embodiment.

Figure 9:
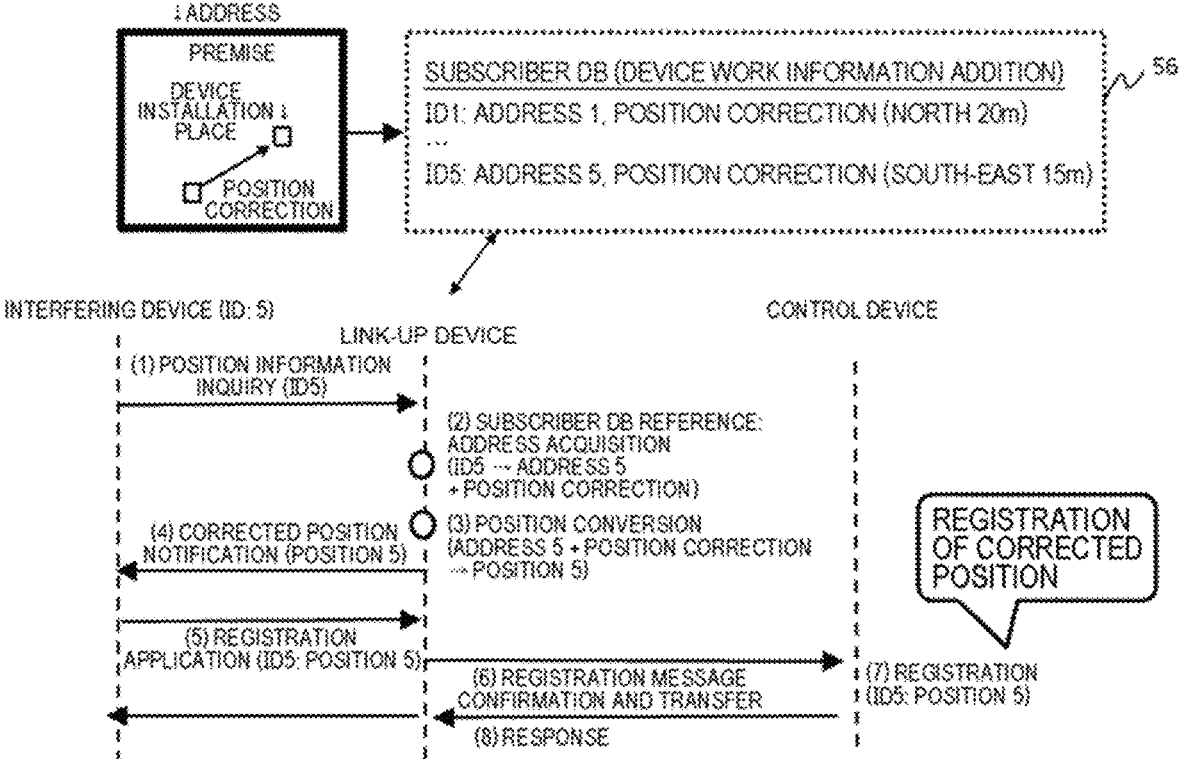
FIG. 9 is a diagram for describing an operation of an interference control system of a second embodiment of the present disclosure.

As illustrated in FIG. 9, in the link-up device 34, first, it is determined whether the ID has been received from any of the interfering devices 30 (step 110).

When the reception of the ID is recognized, it is determined that the position information inquiry is received from the interfering device 30, and the address (for example, "address 5") corresponding to the ID (for example, "ID 5") is acquired from the subscriber DB 56 (step 112).

Next, the link-up device 34 performs position conversion on the acquired address, and acquires the converted position information indicating the position of the address (step 114). Specifically, "latitude and longitude" corresponding to the address is acquired as the converted position information on the basis of map information stored in the information storage unit 52.

When the above processing is finished, the link-up device 34 transmits the converted position information to the interfering device 30 that has issued the inquiry (step 116).

Next, the link-up device 34 determines whether a registration application has been received from the interfering device 30 that has returned the converted position information (step 118).

In a case where reception of the registration application is not recognized even after a certain waiting time, it is determined that the registration application processing has been stopped for some reason, and the data of the address and the position information referred to in the processing of steps 112 and 114 above is cleared (step 120).

On the other hand, when the reception of the registration application is recognized in step 118 above, next, it is determined whether or not the information regarding the position included in the application matches the converted position information acquired in step 114 above (step 122).

In a case where matching between the two pieces of information is not recognized in step 122 above, it can be determined that there is a possibility that registration of uncertain information is requested from the interfering device 30. In this case, the link-up device 34 transmits a response indicating that the registration is not permitted to the interfering device 30 (step 124).

On the other hand, in step 122 above, when matching between the two pieces of information is recognized, the converted position information is set as the position information, and the registration application is transmitted toward the control device 14 (step 126).

Next, the link-up device 34 determines whether or not a response regarding whether or not registration is acceptable has been received from the control device 14 (step 128).

Then, when receiving the response from the control device 14, the link-up device 34 transmits the response toward the interfering device 30 that has issued the registration application (step 130).

Thereafter, after the reference data is cleared by the processing of step 120, the processing of the link-up device 34 regarding the present registration ends.

According to the above processing, the position information of the interfering device 30 included in the carrier NW 32 can be provided to the control device 14 after being corrected and confirmed by the link-up device 34. Therefore, with the interference control system of the present embodiment, it is possible to unfailingly secure the accuracy of the position of the interfering device 30, and it is possible to accurately calculate the interference amount with respect to the interfered device 10.

Modification of First Embodiment

Meanwhile, in the first embodiment described above, a notification of the converted position information is given from the link-up device 34 to the interfering device 30, and the interfering device 30 includes the converted position information in the registration application. However, the present disclosure is not limited thereto. For example, the above notification may be eliminated, and the registration application issued by the interfering device 30 may be permitted to include information regarding the position set by the subscriber. If the registration is permitted when the information set by the subscriber matches the converted position information acquired by the link-up device 34, the accuracy of the registration information can be appropriately ensured. Note that, in this case, the position information registered in the control device 14 may be information set by the subscriber or may be converted position information acquired by the link-up device 34.

Second Embodiment

Next, the second embodiment of the present disclosure will be described with reference to FIGS. 9 and 10 together with FIGS. 2 to 5. The interference control system of the present embodiment can be implemented by the hardware configuration illustrated in FIGS. 2 to 4 as in the case of the first embodiment. In addition, the interference control system of the present embodiment implements the operation described with reference to FIG. 5 by a specific method different from the case of the first embodiment.

Features of Second Embodiment

FIG. 9 is a diagram for describing a flow of processing executed in the present embodiment for registering position information of the interfering device 30 in the control device 14. FIG. 9 specifically illustrates the processing executed regarding registration of the position information in time series in the interference control system of the present embodiment.

In FIG. 9, since processing of (1) and processing of (5) to (8) are similar to those of the first embodiment (see FIG. 6), the description thereof will be omitted here. The present embodiment is characterized by processing (2) to (3) executed by the link-up device 34 that has received the position information inquiry.

(2) In the present embodiment, as illustrated in the upper part of FIG. 9, the subscriber DB 56 stores information of the installation place of the device together with information of the address. The "position" of the "address" refers to a reference point in the site of the address, and does not necessarily coincide with the installation point of the interfering device 30 in the site. In the present embodiment, when the installation of the interfering device 30 is performed in the site of the subscriber, the deviation between the reference point described above and the installation point of the device is measured, and the result is recorded in the subscriber DB 56 as information of "position correction". The "position correction" can be, for example, "deviation in direction and deviation in distance", "deviation in latitude and deviation in longitude", or the like. The link-up device 34 that has received inquiry application (1) for the position information from the interfering device 30 refers to the subscriber DB 56 on the basis of the ID (for example, "ID 5") included in the application, and acquires information of "position correction" associated with the address (for example, "address 5") together with the address.

(3) Next, the link-up device 34 performs position conversion processing. When the "position correction" is a deviation in direction and distance, first, an installation point of the device is specified from the information of the "address" and the "position correction". Next, the installation point is converted into latitude and longitude to be converted position information (for example, "position 5"). In addition, in a case where the "position correction" is a deviation in latitude and longitude, first, the "address" is converted into latitude and longitude, and the "position correction" is reflected on the result to obtain converted position information.

(4) When the above processing is finished, a notification of the information of the corrected position is given to the interfering device 30 as the converted position information.

Figure 10:
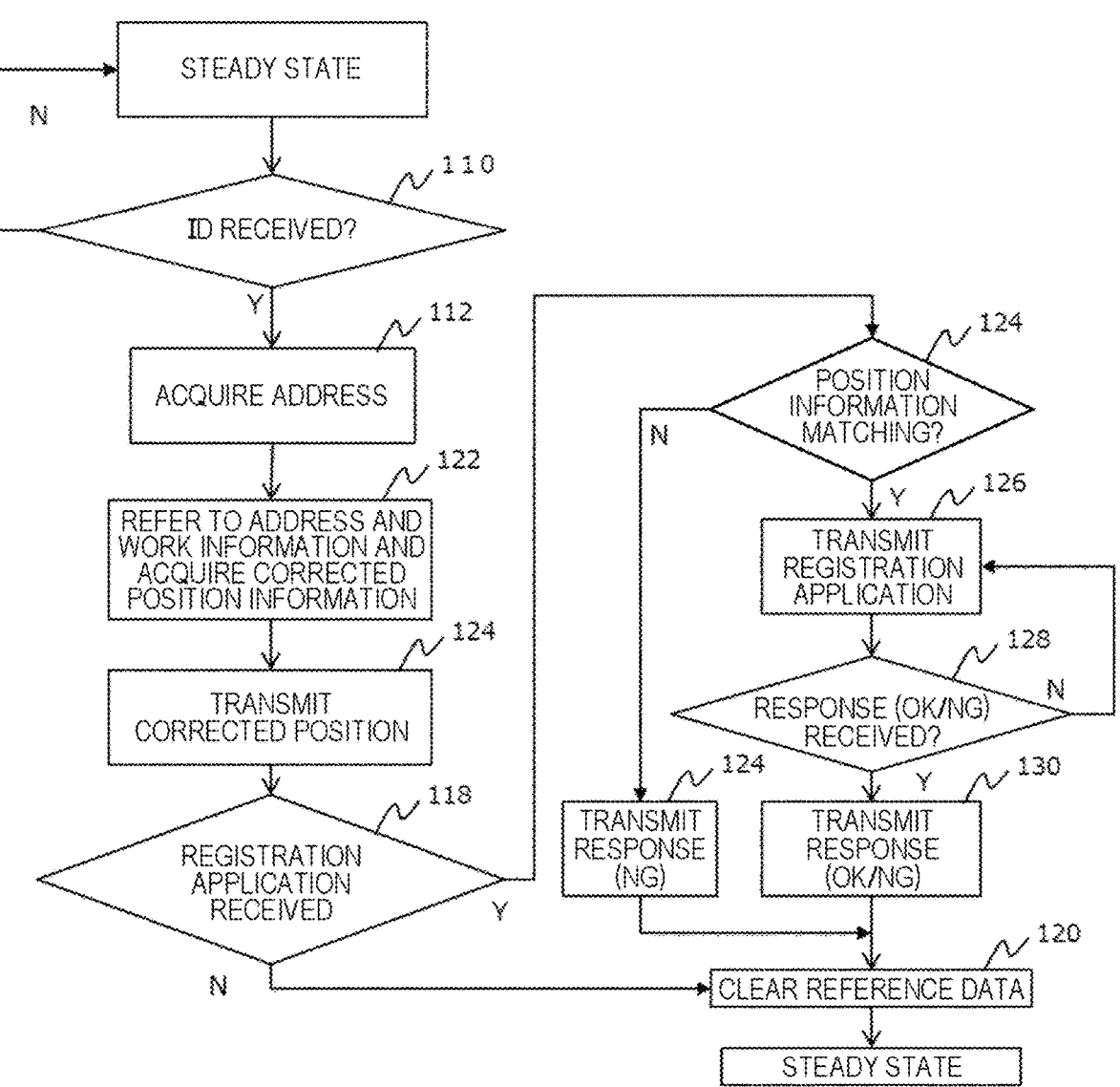
FIG. 10 is a flowchart for describing a flow of processing executed by a link-up device at the time of applying for registration of position information in the second embodiment of the present disclosure.

FIG. 10 is a flowchart for describing a flow of processing executed by the link-up device 34 of the present embodiment regarding registration of position information. Note that, in FIG. 10, the same steps as those illustrated in FIG. 8 are denoted by the same reference numerals, and the description thereof will be omitted or simplified.

As illustrated in FIG. 10, after acquiring the address corresponding to the ID in step 112, the link-up device 34 of the present embodiment acquires information of the corrected position with reference to the subscriber DB 56 (step 122). Specifically, first, work information of the subscriber DB 56 is referred to, and information of "position correction" corresponding to the address is read therefrom. Next, the "address" and the "position correction" are converted into latitude and longitude to generate a "corrected position".

When the above processing is finished, the link-up device 34 notifies the interfering device 30 of the information of the "corrected position" as the converted position information (step 124).

Thereafter, in the link-up device 34, the processing of step 118 and subsequent steps is performed similarly to the case of the first embodiment. In addition, in the interfering device 30 that desires registration of position information, the processing illustrated in FIG. 7 is executed similarly to the case of the first embodiment. Thus, accurate position information indicating the installation point in the site is registered in the control device 14. Therefore, according to the present embodiment, the accuracy of calculating the interference amount experienced by the interfered device 10 can be further improved as compared with the case of the first embodiment.

Modification of Second Embodiment

Note that it is similar to the case of the first embodiment in that it is possible to make a modification such that the notification of the converted position information from the link-up device 34 to the interfering device 30 is eliminated and registration is permitted in a case where the information regarding the position set by the subscriber matches the converted position information acquired by the link-up device 34.

Third Embodiment

Next, the third embodiment of the present disclosure will be described with reference to FIGS. 11 to 13 together with FIGS. 2 to 5. The interference control system of the present embodiment can be implemented by the hardware configuration illustrated in FIGS. 2 to 4 as in the case of the first embodiment. In addition, the interference control system of the present embodiment implements the operation described with reference to FIG. 5 by a specific method different from the case of the first embodiment.

Features of Third Embodiment

Figure 11:
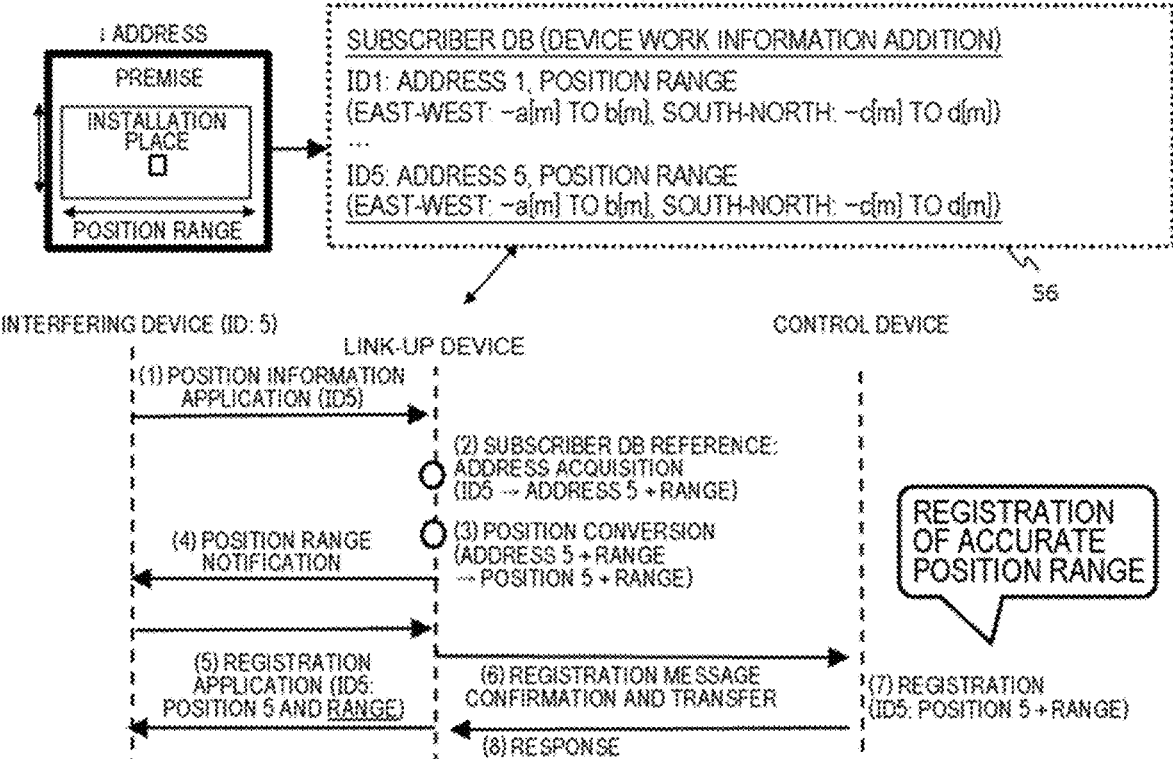
FIG. 11 is a diagram for describing an operation of an interference control system of a third embodiment of the present disclosure.

FIG. 11 is a diagram for describing a flow of processing executed in the present embodiment for registering position information of the interfering device 30 in the control device 14. FIG. 11 specifically illustrates the processing executed regarding registration of the position information in time series in the interference control system of the present embodiment.

In FIG. 11, since processing of (1) and processing of (6) to (8) are substantially similar to those of the first embodiment (see FIG. 6), the description thereof will be omitted or simplified here. The present embodiment is characterized by processing (2) to (3) executed by the link-up device 34 that has received the position information inquiry.

(2) In the present embodiment, as illustrated in the upper part of FIG. 11, the subscriber DB 56 stores information of the position range of the device together with information of the address. This "position range" corresponds to an area where the interfering device 30 can be installed in the site of the address. Specifically, the east-west width (for example, −a[m] to +b[m]) and the south-north width (for example, −c[m] to +d[m]) of the area with respect to the reference point of the "address" are stored as the "position range". In the present embodiment, when the installation work of the interfering device 30 is performed in the site of the subscriber, the information of the "position range" above is obtained and recorded in the subscriber DB 56. The "position range" may be determined by latitude and longitude in addition to distance as described above. The link-up device 34 that has received position information inquiry (1) from the interfering device 30 refers to the subscriber DB 56 on the basis of the ID (for example, "ID 5") included in the application, and acquires information of "position range" associated with the address (for example, "address 5") together with the address.

(3) Next, the link-up device 34 performs position conversion processing. Specifically, similarly to the first embodiment, the "address" is converted into the "position", and the information of the "position" and the "position range" is generated as the converted position information.

(4) When the above processing is finished, a notification of the converted position information including the "position" and the "position range" is given to the interfering device 30 that has issued the inquiry.

(5) The interfering device 30 that has received the converted position information includes the received "position" and "position range" in a message and issues a registration application. Thereafter, substantially the same processing as in the first embodiment is executed, and the "position" and the "position range" are registered in the control device 14.

Figure 12:
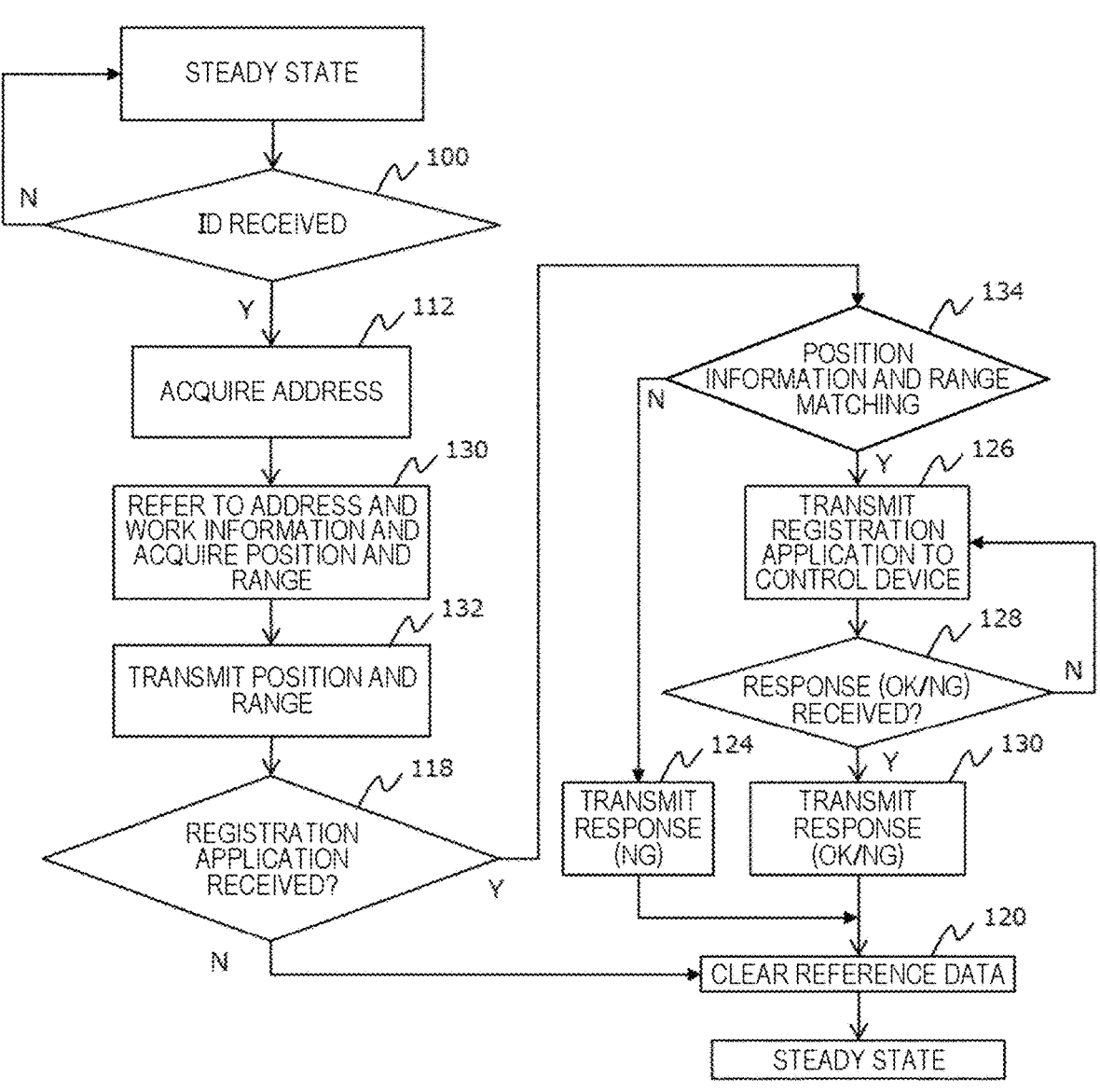
FIG. 12 is a flowchart for describing a flow of processing executed by a link-up device at the time of applying for registration of position information in the third embodiment of the present disclosure.

FIG. 12 is a flowchart for describing a flow of processing executed by the link-up device 34 of the present embodiment regarding registration of position information. Note that, in FIG. 12, the same steps as those illustrated in FIG.

8 are denoted by the same reference numerals, and the description thereof will be omitted or simplified.

As illustrated in FIG. 12, after acquiring the address corresponding to the ID in step 112, the link-up device 34 of the present embodiment acquires the converted position information with reference to the subscriber DB 56 (step 130). Specifically, first, work information of the subscriber DB 56 is referred to, and information of "position range" corresponding to the address is read therefrom. Next, the "address" is converted into "position", and the converted position information including the "position" and the "position range" is generated.

When the above processing is finished, the link-up device 34 notifies the interfering device 30 of the converted position information including the "position" and the "position range" (step 132).

In addition, in the present embodiment, when the reception of the registration application in step 118 is recognized, the link-up device 34 determines whether or not the "position" and the "position range" included in the registration application match the "position" and the "position range" acquired in step 130 above. Thereafter, in the link-up device 34, the processing of step 124 or 126 and subsequent steps is performed as in the case of the first embodiment according to the result of the determination.

Figure 13:
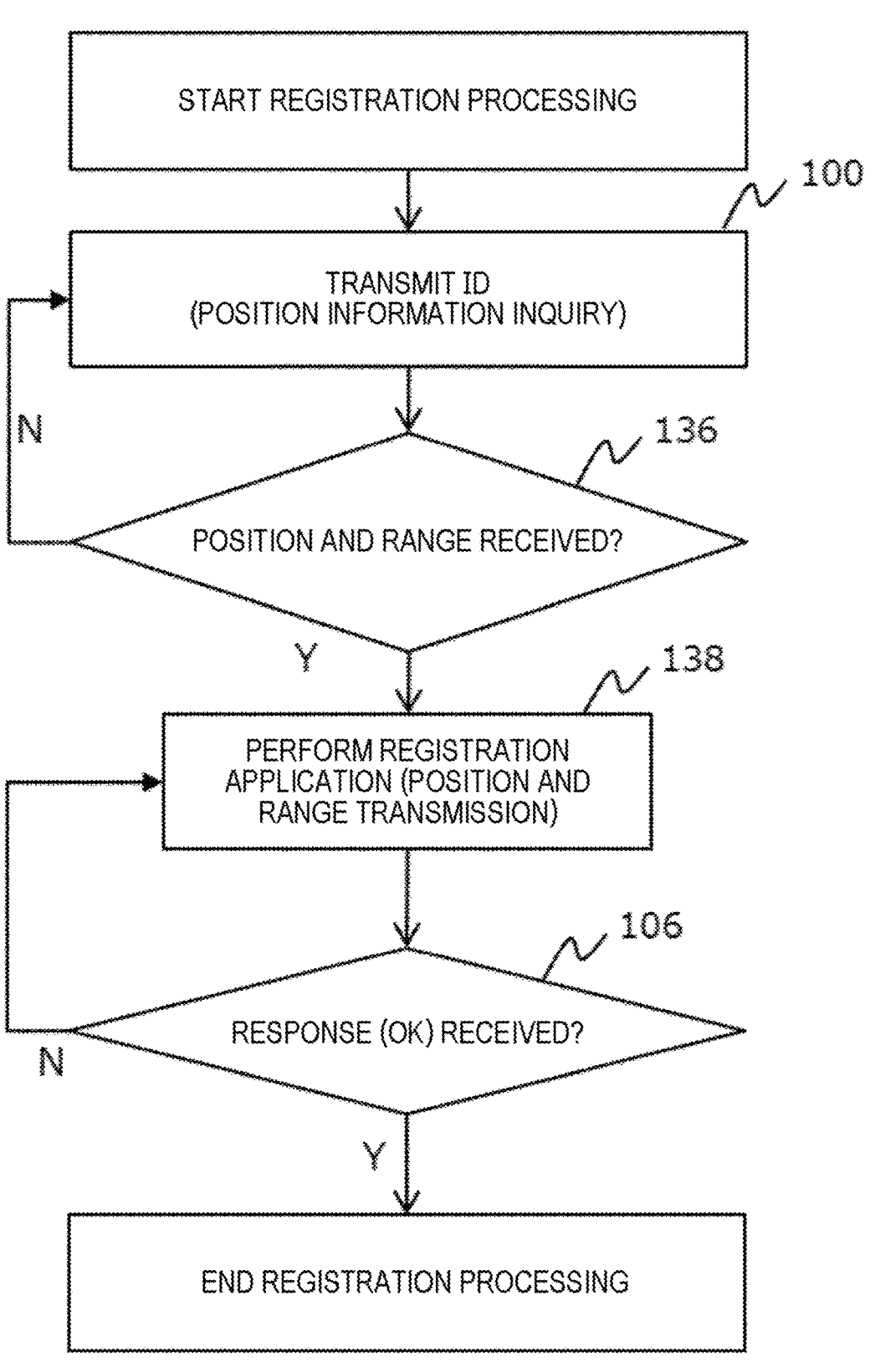
FIG. 13 is a flowchart for describing a flow of processing executed by an interfering device disposed in a carrier NW at the time of applying for registration of position information in the third embodiment of the present disclosure.

FIG. 13 is a flowchart for describing a flow of processing executed by the interfering device 30 regarding registration of position information in the present embodiment. Note that, in FIG. 13, the same steps as those illustrated in FIG. 7 are denoted by the same reference numerals, and the description thereof will be omitted or simplified.

As illustrated in FIG. 13, in the interfering device 30 according to the present embodiment, after the processing of step 100, it is determined whether the converted position information including the "position" and the "position range" has been received from the link-up device 34 (step 136).

Then, when the reception of the converted position information is recognized, the registration application including the "position" and the "position range" included therein is transmitted toward the link-up device 34 (step 138). The "position" and the "position range" transmitted in this manner are registered in the control device 14 through confirmation by the link-up device 34 as described above. Then, as in the case of the first embodiment, when a response from the control device 14 is received, the processing of the interfering device 30 regarding the position registration ends.

As described above, in the interference control system of the present embodiment, the "position" and the "position range" of the device can be registered in the control device 14. The position of the interfering device 30 may be relocated within the "position range". In the case of the first or second embodiment, when the "position" of the interfering device 30 changes by relocation, a situation can occur in which the interference amount cannot be accurately calculated thereafter. In the present embodiment, by setting the "position range" in advance, the interference amount can be calculated with the width of the "position range". Then, when the largest interference amount in the width is adopted, the total interference amount I actually experienced by the interfered device 10 can be suppressed to be equal to or less than the allowable value in any case. Therefore, with the system of the present embodiment, higher communication quality can be secured in the interfered device 10 as compared with the case of the first or second embodiment.

Modification of Third Embodiment

Note that it is similar to the case of the first embodiment in that it is possible to make a modification such that the notification of the converted position information from the link-up device 34 to the interfering device 30 is eliminated and registration is permitted in a case where the information regarding the position set by the subscriber matches the converted position information acquired by the link-up device 34.

Fourth Embodiment

Next, the fourth embodiment of the present disclosure will be described with reference to FIGS. 14 to 18 together with FIGS. 2 to 5. The interference control system of the present embodiment can be implemented by the hardware configuration illustrated in FIGS. 2 to 4 as in the case of the first embodiment. In addition, the interference control system of the present embodiment implements the operation described with reference to FIG. 5 by a specific method different from the case of the first embodiment.

Features of Fourth Embodiment

Figure 14:
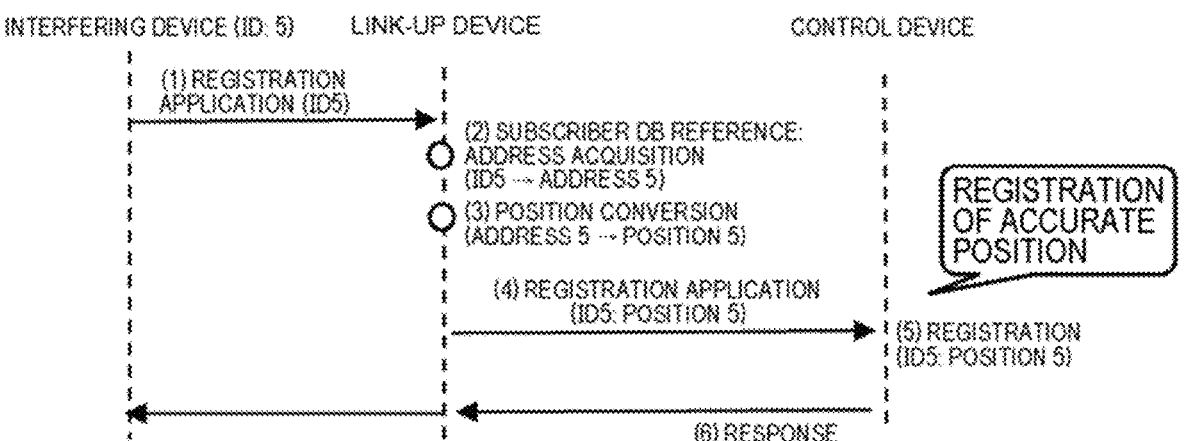
FIG. 14 is a diagram for describing an operation of an interference control system of a fourth embodiment of the present disclosure.

FIG. 14 is a diagram for describing a flow of processing executed in the present embodiment for registering position information of the interfering device 30 in the control device 14. FIG. 14 specifically illustrates a state in which the processing described below is executed in time series regarding registration of position information in the interference control system of the present embodiment.

In the first to third embodiments, the converted position information acquired by the conversion from the ID is temporarily returned from the link-up device 34 to the interfering device 30. On the other hand, the present embodiment is characterized in that the link-up device 34 acquires the position information from the ID and directly transmits the position information to the control device 14 without returning the position information to the interfering device 30.

(1) As illustrated in FIG. 14, in the present embodiment, the interfering device 30 that requests registration of position transmits a registration application including an ID to the link-up device 34.

(2) Similarly to the case of the first embodiment, the link-up device 34 that has received the registration application refers to the subscriber DB 56 and acquires the address (for example, "address 5") corresponding to the ID (for example, "ID 5").

(3) The link-up device 34 further converts the address into position (for example, "position 5") as in the case of the first embodiment.

(4) Thereafter, the link-up device 34 according to the present embodiment transmits a registration application accompanied by a message including the ID (for example, "ID 5") and the position (for example, "position 5") to the control device 14.

(5) The control device 14 registers the position information included in the message transmitted from the link-up device 34 in association with the interfering device 30 having the ID included in the message. Thus, accurate position information set by the link-up device 34 is registered in the control device 14.

(6) Thereafter, when a response is returned from the control device 14 to the interfering device 30 via the link-up device 34, the position registration processing in the present embodiment ends.

Figure 15:
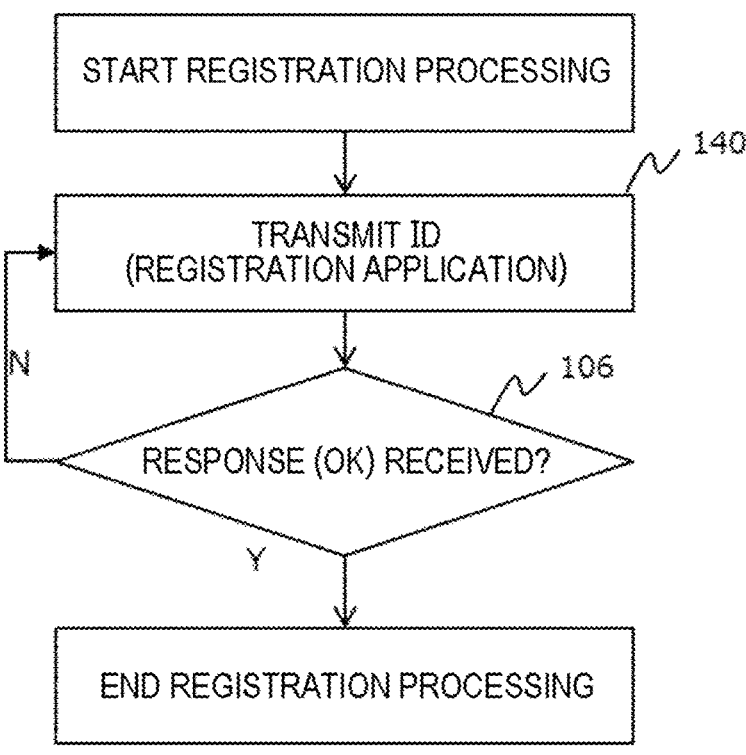
FIG. 15 is a flowchart for describing a flow of processing executed by an interfering device disposed in a carrier NW at the time of applying for registration of position information in the fourth embodiment of the present disclosure.

FIG. 15 is a flowchart for describing a flow of processing executed by the interfering device 30 regarding registration of position information in the present embodiment. Note that, in FIG. 15, the same steps as those illustrated in FIG. 7 are denoted by the same reference numerals, and the description thereof will be omitted or simplified.

As illustrated in FIG. 15, in the present embodiment, the interfering device 30 that requests position registration transmits an ID as a registration application (step 140). Thereafter, when a response is received in step 106, the processing of the interfering device 30 ends.

Figure 16:
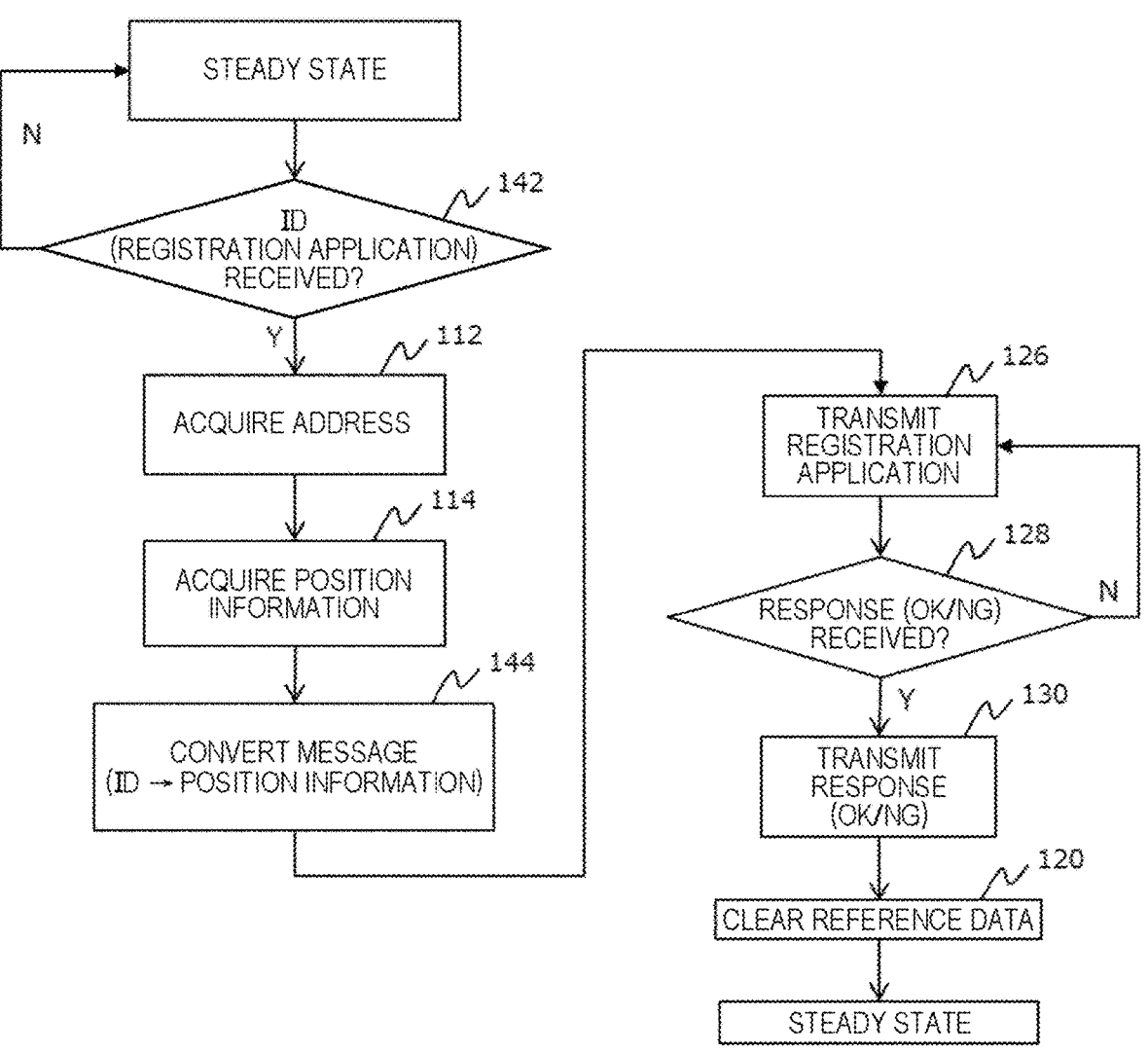
FIG. 16 is a flowchart for describing a flow of processing executed by a link-up device at the time of applying for registration of position information in the fourth embodiment of the present disclosure.

FIG. 16 is a flowchart for describing a flow of processing executed by the link-up device 34 of the present embodiment regarding registration of position information. Note that, in FIG. 16, the same steps as those illustrated in FIG. 8 are denoted by the same reference numerals, and the description thereof will be omitted or simplified.

As illustrated in FIG. 16, the link-up device 34 of the present embodiment determines whether a registration application including an ID has been received from the interfering device 30 (step 142). Then, when the reception of the registration application is recognized, the "position information" is acquired through the processing of steps 112 and 114 similarly to the first embodiment.

Then, the message of the registration application including the ID is converted into a message including "position information" together with the ID (step 144).

Thereafter, in the link-up device 34, the processing of step 126 and subsequent steps is executed similarly to the case of the first embodiment. Then, in step 120, when the reference data is cleared, the processing in the link-up device 34 ends.

As described above, in the interference control system of the present embodiment, the link-up device 34 directly transmits the position information acquired by the conversion from the ID to the control device 14 without returning the position information to the interfering device 30. Thus, according to the present embodiment, it is possible to greatly simplify the processing of the interfering device 30 and the processing of the link-up device 34 as compared with the case of the first embodiment while enabling information registration similar to the case of the first embodiment.

Meanwhile, in the fourth embodiment described above, the technology in which the link-up device 34 directly transmits the position information to the control device 14 is combined with the registration information of the first embodiment, but the present disclosure is not limited thereto.

Figure 17:
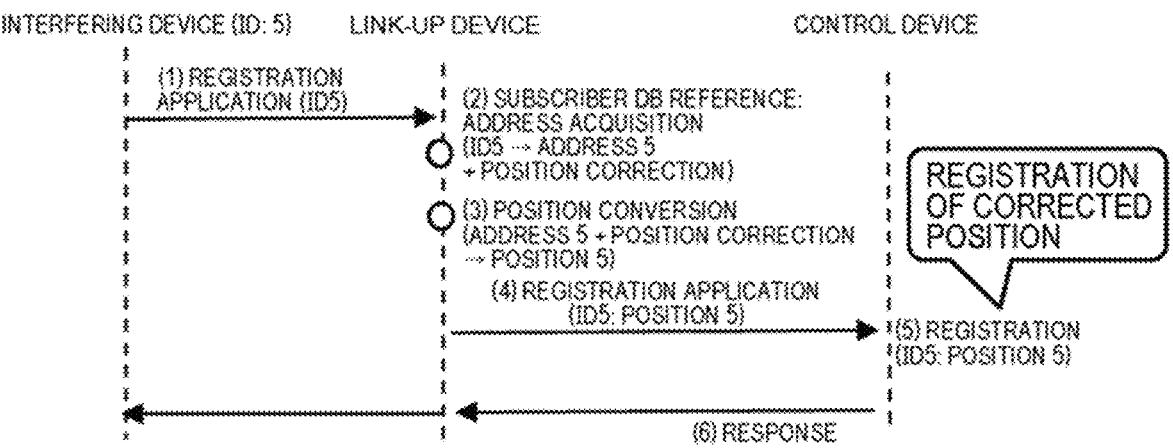
FIG. 17 is a diagram for describing an operation of a first modification of the fourth embodiment of the present disclosure.

FIG. 17 illustrates an operation in a case where the technology in which the link-up device 34 directly transmits the position information to the control device 14 is combined with the registration information of the second embodiment, that is, the "corrected position". According to the operation illustrated in FIG. 17, it is possible to greatly simplify the processing of the interfering device 30 and the processing of the link-up device 34 as compared with the case of the second embodiment while enabling information registration similar to the case of the second embodiment.

Figure 18:
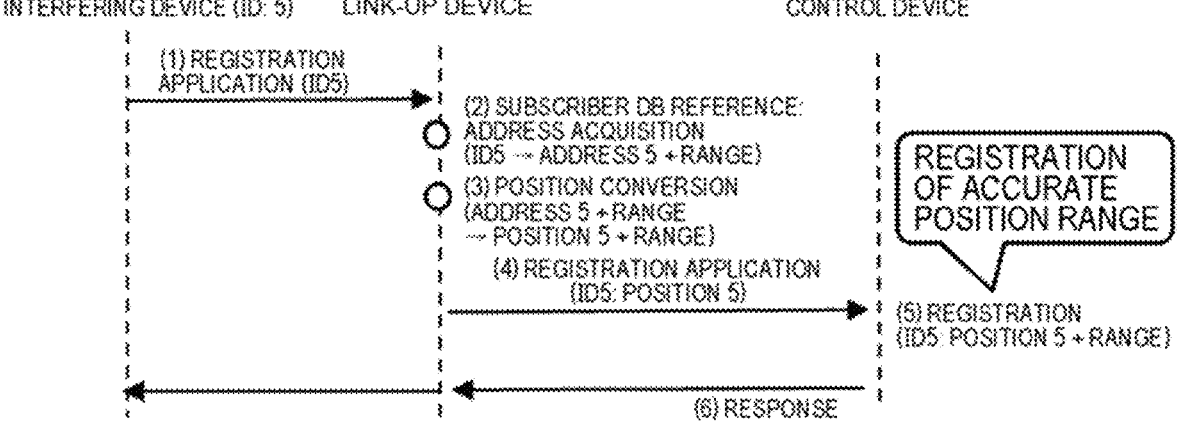
FIG. 18 is a diagram for describing an operation of a second modification of the fourth embodiment of the present disclosure.

FIG. 18 illustrates an operation in a case where the technology in which the link-up device 34 directly transmits the position information to the control device 14 is combined with the registration information of the third embodiment, that is, the position information including the "position" and the "position range". According to the operation illustrated in FIG. 18, it is possible to greatly simplify the processing of the interfering device 30 and the processing of the link-up device 34 as compared with the case of the third embodiment while enabling information registration similar to the case of the third embodiment.

Fifth Embodiment

Next, the fifth embodiment of the present disclosure will be described with reference to FIGS. 19 to 21 together with FIGS. 2 to 5. The interference control system of the present embodiment can be implemented by the hardware configuration illustrated in FIGS. 2 to 4 as in the case of the first embodiment. In addition, the interference control system of the present embodiment implements the operation described with reference to FIG. 5 by a specific method different from the case of the first embodiment.

Features of Fifth Embodiment

Figure 19:
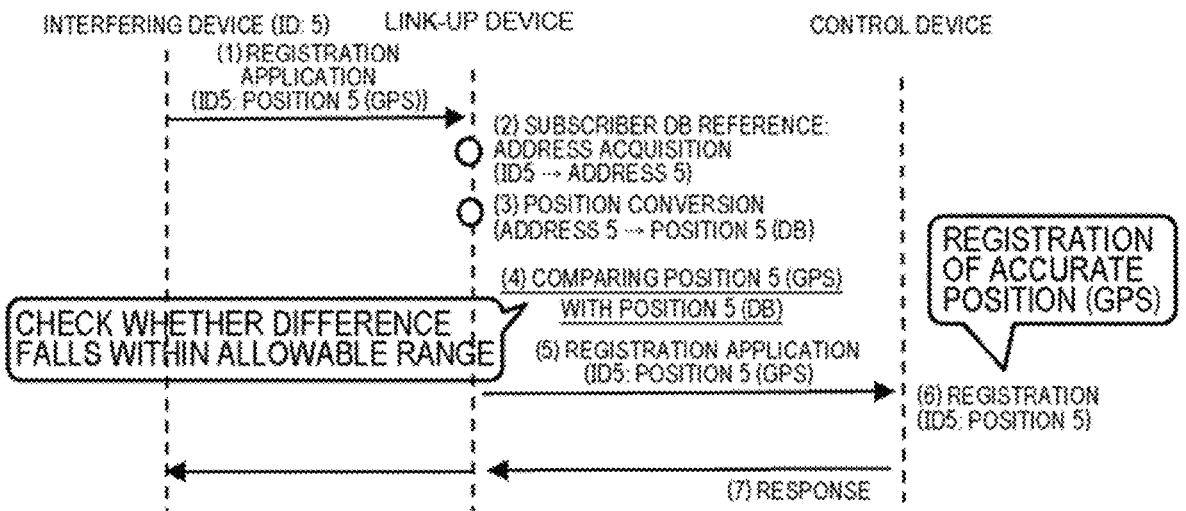
FIG. 19 is a diagram for describing an operation of an interference control system of a fifth embodiment of the present disclosure.

FIG. 19 is a diagram for describing a flow of processing executed in the present embodiment for registering position information of the interfering device 30 having a function of detecting its own position using the GPS in the control device 14. FIG. 19 specifically illustrates a state in which the processing described below is executed in time series regarding registration of position information in the interference control system of the present embodiment.

In the first to third embodiments, the link-up device 34 has the authority to set the position information of the interfering device 30. On the other hand, the present embodiment is characterized in that, in a case where the interfering device 30 has a function of detecting its own position using the GPS, the authority to set the position information is given to the interfering device 30.

(1) As illustrated in FIG. 19, in the present embodiment, the interfering device 30 that requests registration of position transmits a registration application including an ID (for example, "ID 5") and a position (for example, "position 5 (GPS)"; hereinafter referred to as "GPS information") acquired using the GPS to the link-up device 34.

(2) Similarly to the case of the first embodiment, the link-up device 34 that has received the registration application refers to the subscriber DB 56 and acquires the address (for example, "address 5") corresponding to the ID (for example, "ID 5").

(3) The link-up device 34 further converts the address into position (for example, "position 5 (DB)") as in the case of the first embodiment.

(4) Next, the link-up device 34 compares the GPS information (for example, "position 5 (GPS)") received from the interfering device 30 with the position (for example, "position 5 (DB)") acquired with reference to the subscriber DB 56. Then, in a case where they are recognized to match each other, more specifically, in a case where the difference between them falls within a predetermined allowable range, the position information received from the interfering device 30 is recognized to be correct.

(5) When recognizing that the GPS information received from the interfering device 30 is correct, the link-up device 34 transmits a registration application including the ID (for example, "ID 5") and the GPS information (for example, "position 5 (GPS)") toward the control device 14.

(6) The control device 14 registers the GPS information (for example, "position 5 (GPS)") transmitted from the link-up device 34 in association with the ID included in the registration application. Thus, accurate position information acquired using the GPS is registered in the control device 14.

(7) Thereafter, when a response is returned from the control device 14 to the interfering device 30 via the link-up device 34, the position registration processing in the present embodiment ends.

Figure 20:
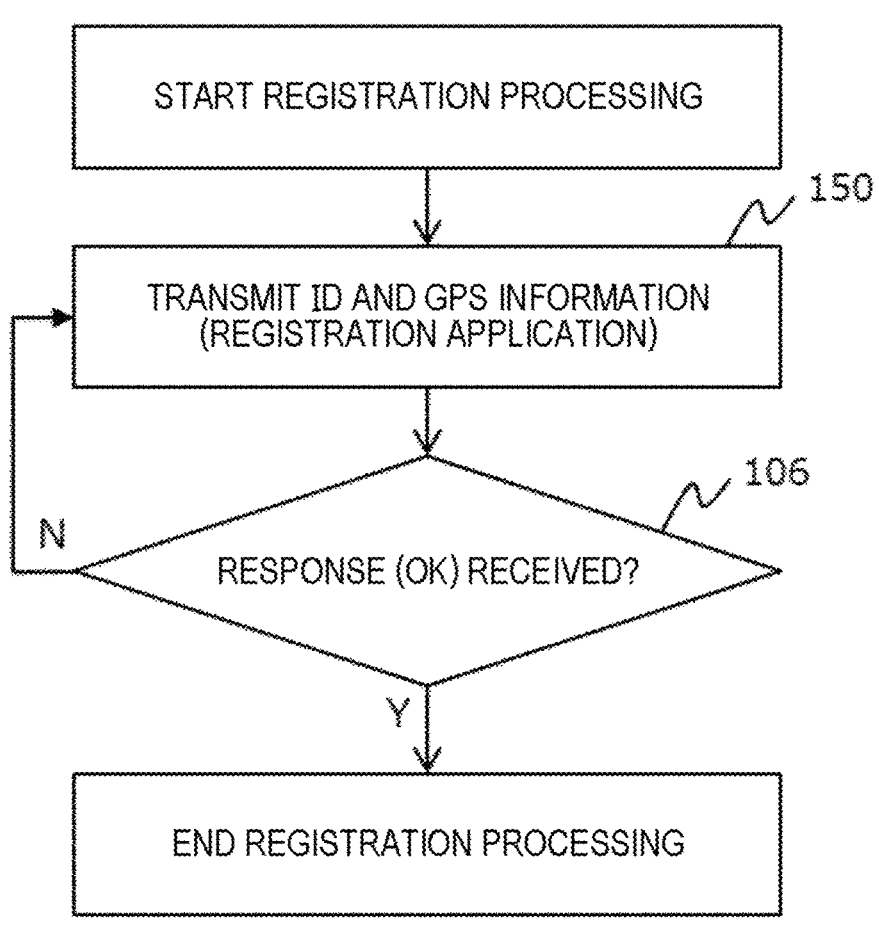
FIG. 20 is a flowchart for describing a flow of processing executed by an interfering device disposed in a carrier NW at the time of applying for registration of position information in the fifth embodiment of the present disclosure.

FIG. 20 is a flowchart for describing a flow of processing executed by the interfering device 30 regarding registration of position information in the present embodiment. Note that, in FIG. 20, the same steps as those illustrated in FIG. 7 are denoted by the same reference numerals, and the description thereof will be omitted or simplified.

In the routine illustrated in FIG. 20, the interfering device 30 requesting position registration transmits a registration application including the GPS information together with the ID (step 150). Thereafter, when a response is received in step 106, the processing of the interfering device 30 ends.

Figure 21:
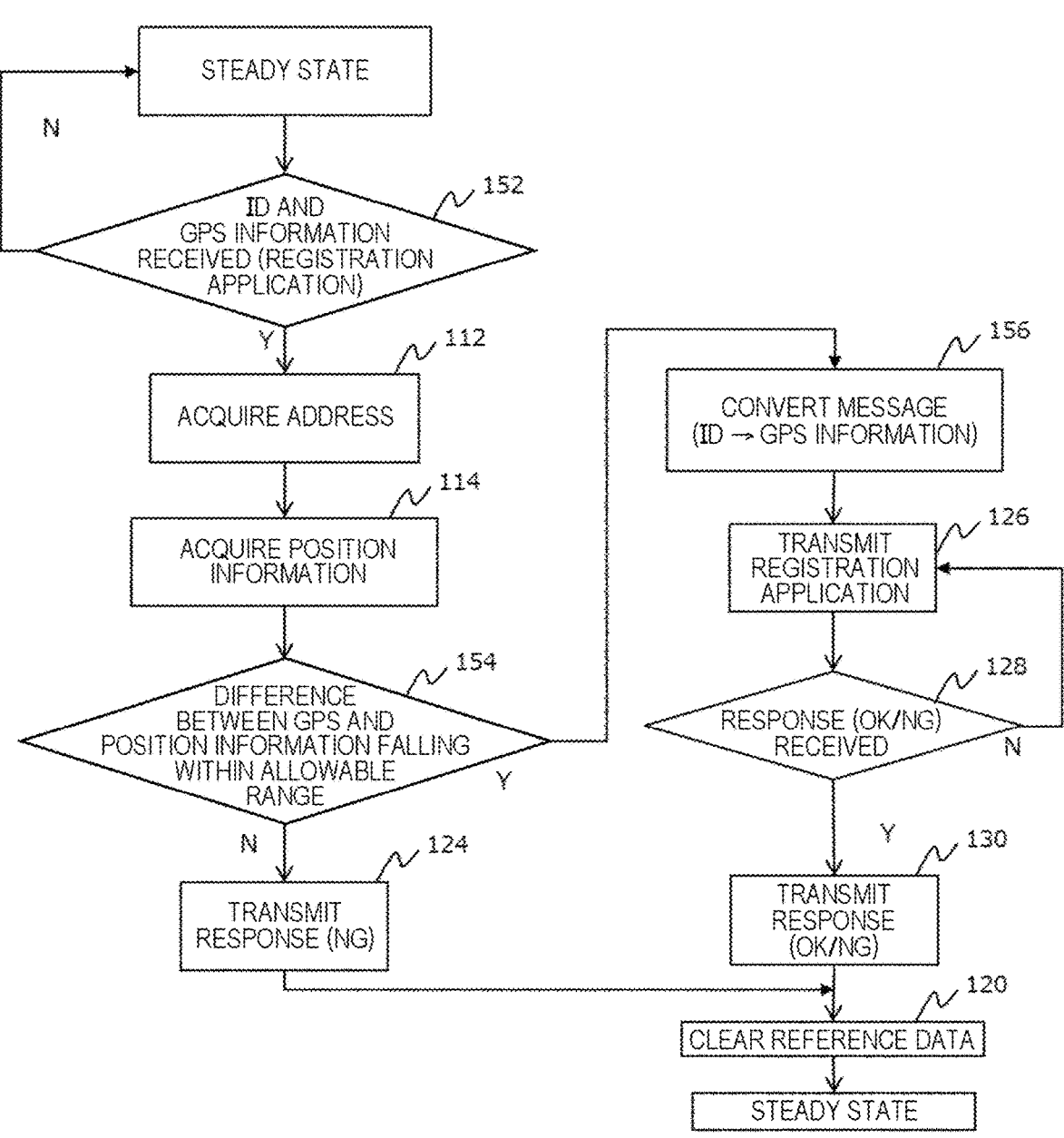
FIG. 21 is a flowchart for describing a flow of processing executed by a link-up device at the time of applying for registration of position information in the fifth embodiment of the present disclosure.

FIG. 21 is a flowchart for describing a flow of processing executed by the link-up device 34 of the present embodiment regarding registration of position information. Note that, in FIG. 21, the same steps as those illustrated in FIG. 8 are denoted by the same reference numerals, and the description thereof will be omitted or simplified.

As illustrated in FIG. 21, the link-up device 34 of the present embodiment determines whether a registration application including the GPS information together with the ID has been received from the interfering device 30 (step 152). Then, when the reception of the registration application is recognized, the "position information (DB)" based on the subscriber DB 56 is acquired through the processing of steps 112 and 114 similarly to the first embodiment.

Next, the link-up device 34 determines whether the GPS information matches the position information (DB) (step 154). Here, in a case where the difference between them falls within a preset allowable range, it is determined that they match. This allowable range may be set on the basis of a range in which the device can move in the site, for example, the "position range" described in the third embodiment. In a case where it is determined in the present step 154 that they do not match each other, there is a possibility that the GPS information is incorrect, and therefore, the processing of step 124 and subsequent steps is executed.

On the other hand, when it is determined that the difference between the GPS information and the position information (DB) falls within the allowable range and they match each other, it can be determined that the GPS information is reliable. In this case, message conversion for transmitting the GPS information as the position information to the control device 14 together with the ID is performed (step 156).

Thereafter, in the link-up device 34, the processing of step 126 and subsequent steps is executed similarly to the case of the first embodiment. Then, in step 120, when the reference data is cleared, the processing in the link-up device 34 ends.

As described above, in the interference control system of the present embodiment, when the interfering device 30 transmits correct GPS information, the GPS information can be registered in the control device 14 as the position information. The GPS information correctly indicates the position of the interfering device 30, and is generally more accurate than the position information (DB) estimated by the link-up device 34 on the basis of the subscriber DB 56. Therefore, according to the present embodiment, the accuracy of the registered position information can be further improved as compared with the first to fourth embodiments.

REFERENCE SIGNS LIST

10 Interfered device
12, 12-1 to 12-5, 30, 30-1 to 30-3 Interfering device
14 Control device
32 Carrier network (carrier NW)
34 Link-up device
36 Public network (public NW)
50 Control unit
52 Information storage unit
56 Subscriber database (DB)

The invention claimed is:

1. An interference control system for wireless communication, the interference control system comprising:
a control device that is disposed outside a carrier network and that is responsible for (i) calculating an interference amount given by a plurality of interfering devices disposed in the carrier network to an interfered device disposed outside the carrier network and (ii) registering position information of each of the plurality of interfering devices; and
a link-up device disposed in the carrier network, communicatively coupled to the control device, and including a processor, a memory that stores a program to be executed by the processor, and a subscriber database that stores information regarding a position of each of the interfering devices,
wherein the processor executes:
processing of receiving a registration application including an ID of an interfering device of the plurality of interfering devices disposed in the carrier network from the interfering device;
position information generation processing of setting position information that matches information stored in the subscriber database regarding the ID upon receiving the registration application; and
processing of transmitting the position information to the control device for registration.

2. The interference control system for wireless communication according to claim 1, wherein
the processor further executes:
processing of receiving a position information inquiry including the ID of the interfering device of the plurality of interfering devices disposed in the carrier network from the interfering device;
DB reference processing of specifying an address stored in the subscriber database regarding the ID upon receiving the position information inquiry;
processing of performing position conversion on the address to acquire converted position information indicating a position of the address; and
processing of returning the converted position information to the interfering device that has issued the position information inquiry,
the registration application includes information regarding the position of the interfering device that has issued the registration application together with the ID, and
the position information generation processing includes processing of, when the information regarding the position included in the registration application matches the converted position information, setting the information regarding the position or the converted position information as the position information.

3. The interference control system for wireless communication according to claim 2, wherein the subscriber database stores information of position correction indicating a deviation between a position of each address and an installation point of the interfering device at each address, the DB reference processing includes processing of specifying the position correction stored in the subscriber database regarding the ID, and the converted position information indicates a corrected position in which the position correction is reflected on a reference point of the address.

4. The interference control system for wireless communication according to claim 2, wherein the subscriber database stores information of a position range in each address where the interfering device can be installed, the DB reference processing includes processing of specifying the position range stored in the subscriber database regarding the ID, and the converted position information indicates a position of the address and a position range of the address.

5. The interference control system for wireless communication according to claim 2, wherein the processing of performing the position conversion includes acquiring latitude and longitude corresponding to the address based on map information to generate the converted position information.

6. The interference control system for wireless communication according to claim 2, wherein the processor further executes processing of clearing reference data regarding the interfering device, including the address specified in the DB reference processing, in a case where the registration application is not received within a predetermined waiting time after the returning of the converted position information.

7. The interference control system for wireless communication according to claim 1, wherein the registration application includes GPS information indicating a position of the interfering device acquired by the interfering device using GPS together with the ID, and the position information generation processing includes processing of, when the GPS information included in the registration application matches information stored in the subscriber database, setting the GPS information as the position information.

8. The interference control system for wireless communication according to claim 1, wherein the control device is disposed in a public network that is distinct from the carrier network, and the link-up device transmits the position information to the control device via the public network.

9. The interference control system for wireless communication according to claim 8, wherein the control device is further responsible for registering position information of a second plurality of interfering devices that are disposed in the public network and that communicate directly with the control device without passing through the link-up device.

10. The interference control system for wireless communication according to claim 1, wherein the processor further executes processing of receiving a response indicating whether registration is acceptable from the control device and transmitting the response to the interfering device of the plurality of interfering devices.

11. An interference control method, the method comprising:

using a control device that is disposed outside a carrier network and that is responsible for (i) calculating an interference amount given by a plurality of interfering devices disposed in the carrier network to an interfered device disposed outside the carrier network and (ii) registering position information of each of the plurality of interfering devices;

receiving, via a link-up device disposed in the carrier network and communicatively coupled to the control device, a registration application from an interfering device of the plurality of interfering devices disposed in the carrier network, the registration application including an ID of the interfering device;

upon receiving the registration application, setting position information that matches information stored in a subscriber database regarding the ID, the subscriber database storing information regarding a position of each of the interfering devices; and transmitting the position information to the control device for registration.

12. A link-up device disposed in a carrier network and communicatively coupled to a control device disposed outside the carrier network, the link-up device comprising:

a processor;

a memory that stores a program to be executed by the processor; and a subscriber database that stores information regarding a position of each of a plurality of interfering devices disposed in the carrier network, wherein the processor executes:

processing of receiving a registration application including an ID of an interfering device of the plurality of interfering devices disposed in the carrier network from the interfering device;

position information generation processing of setting position information that matches information stored in the subscriber database regarding the ID upon receiving the registration application; and processing of transmitting the position information to the control device that is disposed outside the carrier network for registration, the control device being responsible for (i) calculating an interference amount given by the plurality of interfering devices disposed in the carrier network to an interfered device disposed outside the carrier network and (ii) registering position information of each of the plurality of interfering devices.

13. A non-transitory computer readable medium having thereon instructions for causing the processor of the link-up device according to claim 12 to execute:

receiving the registration application;

setting the position information; and transmitting the position information to the control device for registration.

\* \* \* \* \*